(12) United States Patent
Kang et al.

(10) Patent No.: US 10,461,888 B2
(45) Date of Patent: Oct. 29, 2019

(54) APPARATUS AND METHOD FOR CONTROLLING RECEIVING DATA

(71) Applicants: Shinwoo Kang, Seoul (KR); Soobok Yeo, Gyeonggi-do (KR); Mingoo Kim, Gyeonggi-do (KR); Chaehag Yi, Gyeonggi-do (KR); Juhyuk Im, Gyeonggi-do (KR)

(72) Inventors: Shinwoo Kang, Seoul (KR); Soobok Yeo, Gyeonggi-do (KR); Mingoo Kim, Gyeonggi-do (KR); Chaehag Yi, Gyeonggi-do (KR); Juhyuk Im, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/073,038

(22) Filed: Mar. 17, 2016

(65) Prior Publication Data

US 2017/0033893 A1 Feb. 2, 2017

(30) Foreign Application Priority Data

Jul. 28, 2015 (KR) ........................ 10-2015-0106698

(51) Int. Cl.
*H04L 1/00* (2006.01)
*H04B 17/318* (2015.01)
*H04B 17/336* (2015.01)

(52) U.S. Cl.
CPC ......... *H04L 1/0045* (2013.01); *H04B 17/318* (2015.01); *H04B 17/336* (2015.01); *H04L 1/0061* (2013.01)

(58) Field of Classification Search
CPC .......... G11B 20/1833; H03M 13/2957; H03M 13/29; H03M 13/1515; H03M 13/2909;
(Continued)

(56) References Cited

U.S. PATENT DOCUMENTS 5,117,427 A * 5/1992 Miyake ............. H03M 13/1515
714/755
6,952,443 B1 10/2005 Kong et al.
(Continued)

FOREIGN PATENT DOCUMENTS

TW 201517542 5/2015

OTHER PUBLICATIONS

Taiwanese Office Action dated Aug. 19, 2019 issued in counterpart application No. 10820779540, 13 pages.

*Primary Examiner* — Samir W Rizk
*Assistant Examiner* — Enam Ahmed
(74) *Attorney, Agent, or Firm* — The Farrell Law Firm, P.C.

(57) ABSTRACT

A method of operating an electronic device in a wireless communication system, the electronic device, and a wireless communication integrated circuit are provided. The method includes decoding first data wherein an amount of the first data received within one transmission time interval reaches a target amount; if decoding of the first data succeeds, decoding second data that comprises the first data and additional data received during a unit section within the one transmission time interval; if decoding of the second data succeeds, transmitting the decoded second data; and terminating decoding of data received after receiving the second data within the one transmission time interval.

16 Claims, 16 Drawing Sheets

(58) Field of Classification Search
CPC ... H04L 1/0045; H04L 1/0051; H04L 1/0061;
H04L 1/0036; H04L 1/0023; H04B
17/336; H04B 17/318; Y02D 70/166;
Y02D 70/142; Y02D 70/1242; Y02D
70/00; Y02D 70/1222; Y02D 70/164;
Y02D 70/1262; Y02D 70/26; Y02D
70/1264; Y02D 70/168; Y02D 70/144;
Y02D 70/162
USPC .......................................... 714/755
See application file for complete search history.

(56) References Cited

U.S. PATENT DOCUMENTS

| | | | | |
|---|---|---|---|---|
| 7,042,963 | B1* | 5/2006 | Raith | H04L 1/0025 375/341 |
| 7,128,115 | B2* | 10/2006 | Caretta | B29D 30/0016 156/396 |
| 7,257,760 | B2 | 8/2007 | Rick et al. | |
| 7,454,225 | B2 | 11/2008 | Ozarow et al. | |
| 7,680,125 | B2 | 3/2010 | Hosein et al. | |
| 8,102,951 | B2 | 1/2012 | Eun et al. | |
| 8,190,964 | B2* | 5/2012 | Maiuzzo | H03M 13/154 714/755 |
| 8,923,171 | B2 | 12/2014 | Salvekar et al. | |
| 9,622,147 | B2 | 4/2017 | Kim et al. | |
| 2001/0043618 | A1* | 11/2001 | Chien | H04B 7/2643 370/498 |
| 2002/0174401 | A1* | 11/2002 | Wang | H04L 1/005 714/786 |
| 2003/0192003 | A1* | 10/2003 | Das | H03M 13/09 714/758 |
| 2005/0172200 | A1* | 8/2005 | Nagase | H03M 13/2957 714/755 |
| 2006/0072508 | A1 | 4/2006 | Zou et al. | |
| 2006/0217142 | A1* | 9/2006 | Inaba | H04W 52/143 455/522 |
| 2008/0186976 | A1* | 8/2008 | Axnas | H04L 1/04 370/395.4 |
| 2012/0243515 | A1 | 9/2012 | Xue et al. | |
| 2012/0281675 | A1 | 11/2012 | Liang et al. | |
| 2013/0027381 | A1 | 1/2013 | Nathan et al. | |
| 2013/0051272 | A1* | 2/2013 | Wiberg | H04L 1/1829 370/252 |
| 2013/0223412 | A1 | 8/2013 | Sambhwani | |
| 2013/0235957 | A1* | 9/2013 | El Khamy | H04L 1/0051 375/341 |
| 2014/0078946 | A1 | 3/2014 | Salvekar et al. | |
| 2014/0078951 | A1 | 3/2014 | Venkatachari et al. | |
| 2014/0080537 | A1 | 3/2014 | Udupa Sripathi et al. | |
| 2014/0187248 | A1 | 7/2014 | Black et al. | |
| 2015/0289205 | A1 | 10/2015 | Kim et al. | |
| 2016/0204908 | A1* | 7/2016 | Rafique | H04L 1/203 370/252 |
| 2016/0337995 | A1* | 11/2016 | Chae | H04W 56/002 |
| 2017/0005674 | A1* | 1/2017 | Hussain | H03M 13/2975 |

* cited by examiner

APPARATUS AND METHOD FOR CONTROLLING RECEIVING DATA

PRIORITY

This application claims priority under 35 U.S.C. § 119(a) to a Korean Patent Application entitled filed on Jul. 28, 2015 in the Korean Intellectual Property Office and assigned Serial No. 10-2015-0106698, the entire contents of which are incorporated herein by reference.

BACKGROUND

1. Field of the Disclosure

The present disclosure relates generally to an apparatus and method for controlling receiving data through decoding, and more particularly, to an apparatus and method for performing decoding before receiving all data within one transmission time interval (TTI).

2. Description of the Related Art

With the growth of communication technologies, there is a demand for not only cellular communication services but also various communication services such as Internet of Things (IoT), etc. In addition, with the demand for these various communication services, devices receive a plurality of data. A device receiving a plurality of data must have efficient decoding and power use.

SUMMARY

An aspect of the present disclosure provides an electronic device and method to perform decoding before receiving all data within one TTI.

In accordance with an aspect of the present disclosure, a method of operating electronic device is provided. The method includes decoding first data wherein an amount of the first data received within one transmission time interval (TTI) reaches a target amount, if decoding of the first data succeeds, decoding second data that comprises the first data and additional data received during a unit section within the one TTI, if decoding of the second data succeeds, transmitting the decoded second data, and terminating decoding of data received after receiving the second data within the one TTI.

In accordance with another aspect of the present disclosure, a wireless communication integrated circuit is provided. The wireless communication integrated circuit includes at least one channel decoder, and a controller operatively coupled to the at least one channel decoder, wherein the controller is configured to decode first data, wherein an amount of the first data received within one TTI reaches a target amount, if decoding of the first data succeeds, decode second data that includes the first data and additional data received during a unit section within the one TTI, if decoding of the second data succeeds, transmit the decoded second data, and terminate decoding of data received after receiving the second data within the one TTI.

In accordance with another aspect of the present disclosure, an electronic device in a wireless communication system is provided. The electronic device includes at least one processor configured to execute instructions, at least one receiver operatively coupled to the at least one processor, and at least one channel decoder operatively coupled to the at least one processor, wherein the processor is configured to decode first data wherein an amount of the first data received within one TTI reaches a target amount, if decoding of the first data succeeds, decode second data that includes the first data and additional data received during a unit section within the one TTI, if decoding of the second data succeeds, transmit the decoded second data, and terminate decoding of the data received after receiving the second data within the one TTI.

BRIEF DESCRIPTION OF THE DRAWINGS

The above and other aspects, features and advantages of the present disclosure will become more apparent from the following detailed description, taken in conjunction with the accompanying drawings in which.

DETAILED DESCRIPTION OF EMBODIMENTS OF THE PRESENT DISCLOSURE

Figure 1:
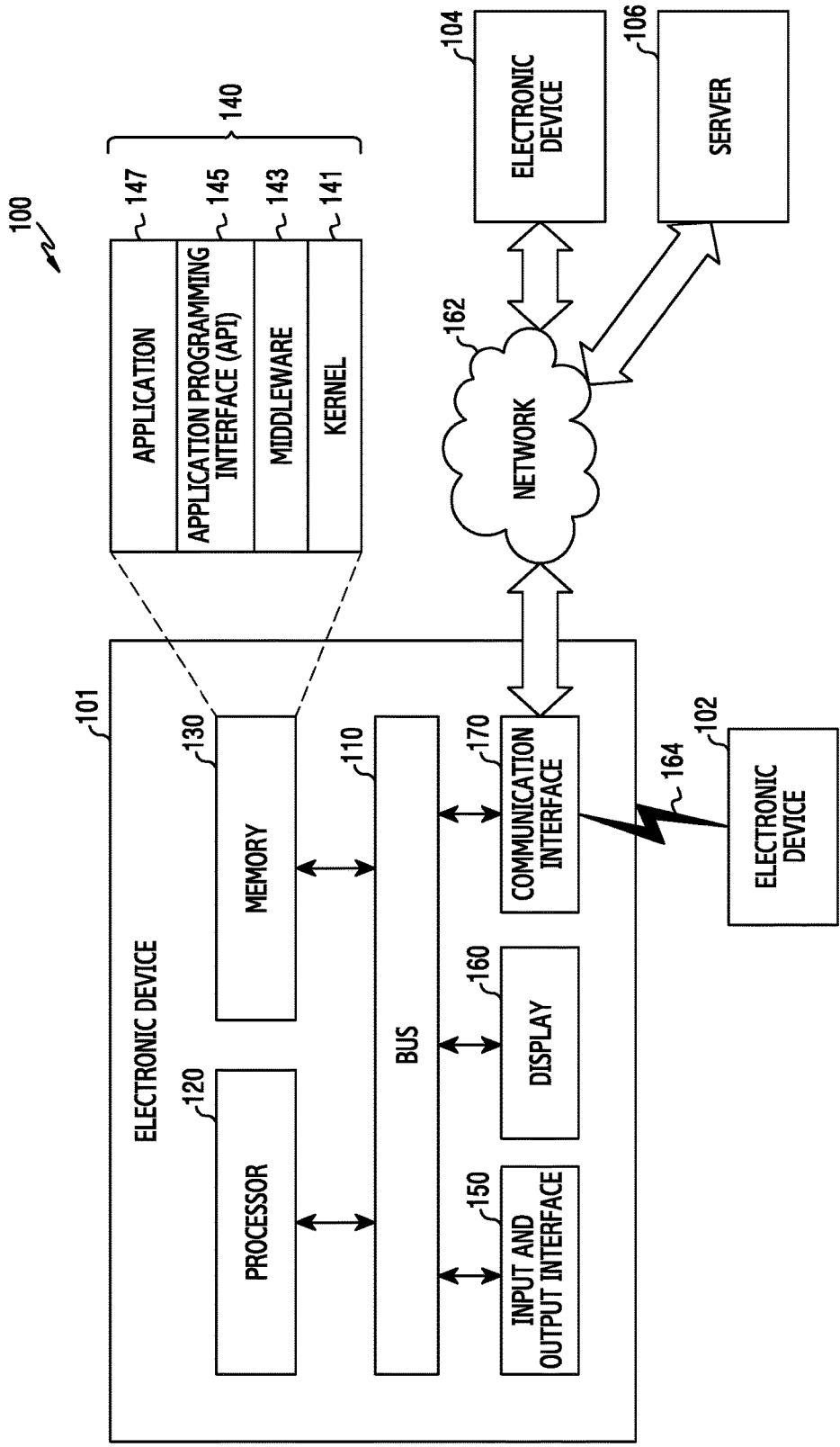
FIG. 1 is a block diagram of an electronic device within a network environment according to an embodiment of the present disclosure.

Embodiments of the present disclosure are described herein below with reference to the accompanying drawings. However, the embodiments of the present disclosure are not limited to the embodiments and should be construed as including all modifications, changes, equivalent devices and methods, and/or alternative embodiments of the present disclosure. In the description below of the accompanying drawings, similar reference numerals are used for similar elements.

The terms "have," "may have," "include," and "may include" as used herein indicate the presence of corresponding features (for example, elements such as numerical values, functions, operations, or parts), but do not preclude the presence of additional features.

The terms "A or B," "at least one of A and/or B," or "one or more of A and/or B" as used herein include all possible combinations of items enumerated with them. For example, "A or B," "at least one of A and B," or "at least one of A or B" indicates (1) including at least one A, (2) including at least one B, or (3) including both at least one A and at least one B.

The terms such as "first" and "second" as used herein may modify various elements regardless of an order and/or importance of the corresponding elements, but do not limit the corresponding elements. These terms may be used for the purpose of distinguishing one element from another element. For example, a first user device and a second user device may indicate different user devices regardless of the order or importance. For example, a first element may be referred to as a second element without departing from the scope and spirit the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be replaced with "suitable for," "having the capacity to," "designed to," "adapted to," "made to," or "capable of" according to a context. The expression "configured to (set to)" does not necessarily indicate "specifically designed to" in a hardware context. Instead, the expression "apparatus configured to . . . " may indicate that the apparatus is "capable of . . . " along with other devices or parts in a certain context. For example, "a processor configured to (set to) perform A, B, and C" may indicate a dedicated processor (e.g., an embedded processor) for performing a corresponding operation, or a general purpose processor (e.g., a central processing unit (CPU) or an application processor) capable of performing a corresponding operation by executing one or more software programs stored in a memory device.

The terms used in describing the various embodiments of the present disclosure are just for the purpose of describing particular embodiments and are not intended to limit the present disclosure. As used herein, the singular forms are intended to include the plural forms as well, unless the context clearly indicates otherwise. All of the terms used herein have the same meanings as those generally understood by a person of ordinary skill in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in the present disclosure should not be interpreted as excluding the embodiments of the present disclosure.

An electronic device according to the embodiments of the present disclosure may include at least one of a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a moving picture experts group audio layer 3 (MP3) player, a mobile medical machine, a camera, or a wearable device (for example, smart glasses, a head-mounted-device (HMD), electronic clothing, an electronic bracelet, an electronic necklace, an electronic appcessory, electronic tattoos, a smart mirror, or a smart watch).

An electronic device may be a smart home appliance. For example, a smart home appliance may include at least one of a television, a digital video disk (DVD) player, a stereo, a refrigerator, an air conditioner, a cleaner, an oven, a microwave oven, a washing machine, an air cleaner, a set-top box, a home automation control panel, a security control panel, a TV box (for example, Samsung HomeSync™, Apple TV®, or Goggle TV), a game console (for example, Xbox™, PlayStation®), an electronic dictionary, an electronic key, a camcorder, or an electronic album.

An electronic device may also include at least one of various medical machines (for example, various portable medical measurement devices (such as a glucose monitor, a heart rate monitor, a blood pressure measuring device, or a thermometer), magnetic resonance angiography (MRA), magnetic resonance imaging (MRI), computerized tomography (CT), a tomograph, an ultrasound machine, and the like), a navigation device, a global positioning system (GPS) receiver, an event data recorder (EDR), a flight data recorder (FDR), an automotive infotainment device, electronic equipment for ship (such as navigation equipment for ship, a gyro compass, and the like), avionics, a security device, a head unit for vehicles, an industrial or home robot, an automatic teller machine (ATM) of a financial institution, point of sale (POS) device of a store, or IoT (for example, a lamp, various sensors, an electric or gas meter, a sprinkler, a fire alarm, a thermostat, a streetlamp, a toaster, an exercise machine, a hot water tank, a heater, a boiler, etc.).

An electronic device may further include at least one of a part of furniture or a building/structure, an electronic board, an electronic signature receiving device, a projector, and various measurement devices (such as devices for measuring water, power, gas, radio waves, and the like). An electronic device may be one or a combination of one or more of the above-mentioned devices. In addition, an electronic device may be a flexible electronic device. In addition, an electronic device according to the present disclosure is not limited to the above-mentioned devices, and may include new electronic devices according to the development of new technologies.

Hereinafter, an electronic device according to various embodiments of the present disclosure is described with reference to the accompanying drawings. The term "user" as used herein may refer to a person who uses an electronic device or a device that uses an electronic device (for example, an artificial intelligence electronic device).

FIG. 1 is a block diagram of an electronic device 101 within a network environment 100 according to an embodiment of the present disclosure.

Referring to FIG. 1, the electronic device 101 in the network environment 100 according to an embodiment of the present disclosure may include a bus 110, a processor 120, a memory 130, an input and output interface 150, a display 160, and a communication interface 170. The electronic device 101 may omit at least one of the elements 110-170 or may include additional elements.

The bus 110 may include a circuit which connects the elements 110-170 with one another and transmits communication (for example, a control message and/or data) between the elements 110-170.

The processor 120 may include one or more of a central processing unit (CPU), an application processor (AP), or a communication processor (CP). The processor 120 may execute calculations or process data related to control and/or communication with at least one other element 110-170 of the electronic device 101.

The memory 130 may include a volatile and/or non-volatile memory. For example, the memory 130 may store instructions or data which are related to at least one other element 110-170 of the electronic device 101. The memory 130 may store software and/or a program 140. The program 140 may include a kernel 141, middleware 143, an application programming interface (API) 145, and/or an application program (or an application) 147, and the like. At least some of the kernel 141, the middleware 143, or the API 145 may be referred to as an operating system (OS).

The kernel 141 may control or manage system resources (for example, the bus 110, the processor 120, the memory 130, and the like) which are used for performing operations or functions implemented in the other programs (for example, the middleware 143, the API 145, or the application 147). In addition, the kernel 141 may provide an interface for allowing the middleware 143, the API 145, or the application program 147 to access an individual element 110-170 of the electronic device 101 and control or manage the system resources.

The middleware 143 may serve as an intermediary to allow the API 145 or the application program 147 to communicate with the kernel 141 and exchange data with the kernel 141.

In addition, the middleware 143 may process one or more operation requests received from the application program 147 according to a priority. For example, the middleware 143 may give priority to use the system resources of the electronic device 101 (for example, the bus 110, the processor 120, the memory 130, and the like) to at least one of application program 147. For example, the middleware 143 may perform scheduling or load balancing with respect to the one or more operation requests by processing the one or more operation requests according to the priority given to the at least one application program 147.

The API 145 may be an interface for allowing the application 147 to control a function provided by the kernel 141 or the middleware 143, and may include at least one interface or function (or instructions) for controlling a file, controlling a window, processing an image, or controlling a text.

The input and output interface 150 may serve as an interface for transmitting instructions or data input from a user or another external device to other element(s) 110-170 of the electronic device 101. In addition, the input and output interface 150 may output instructions or data received from other element(s) 110-170 of the electronic device 101 to a user or another external device.

The display 160 may include a liquid crystal display (LCD), a light emitting diode (LED) display, an organic light emitting diode (OLED) display, or a microelectromechanical system (MEMS) display, or an electronic paper display. The display 160 may display various contents (for example, a text, an image, a video, an icon, a symbol, etc.) for a user. The display 160 may include a touch screen, and may receive input of a touch using an electronic pen or a part of a user's body, a gesture, an approach, or a hovering.

The communication interface 170 may establish communication between the electronic device 101 and a first external electronic device 102, a second external electronic device 104, or a server 106. The communication interface 170 may be connected to a network 162 via wireless communication or wire communication to communicate with the second external device 104 or the server 106.

The wireless communication may use, as a cellular communication protocol, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc. In addition, the wireless communication may include short-distance communication 164. For example, the short-distance communication 164 may include at least one of wireless fidelity (WiFi), Bluetooth (BT), near field communication (NFC), GPS, etc. The wire communication may include at least one of a universal serial bus (USB), a high definition multimedia interface (HDMI), a recommended standard 232 (RS-232), or a plain old telephone service (POTS). The network 162 may include a telecommunications network, for example, at least one of a computer network (for example, a local area network (LAN) or wide area network (WAN)), the Internet, or a telephone network.

Each of the first external electronic device 102 and the second external electronic device 104 may be the same type of electronic device as the electronic device 101 or a different type of electronic device. According to an embodiment of the present disclosure, the server 106 may include a group of one or more servers. Furthermore, all or a part of the operations executed in the electronic device 101 may be executed in another electronic device or a plurality of other electronic devices, such as the first and second external electronic devices 102, 104 or the server 106. When the electronic device 101 is to perform a certain function or service automatically or in response to a request, the electronic device 101 may request the first and second external devices 102, 104 or the server 106 to perform at least some function related to the certain function or service additionally or instead of executing the function or service by the electronic device 101. The first and second external electronic devices 102, 104 or the server 106 may execute the requested function or an additional function, and transmit the result to the electronic device 101. The electronic device 101 may process the received result as is or additionally process the received result, and provide the requested function or service. To achieve this, cloud computing, distributed computing, or client-server computing technology may be used, for example.

Figure 2:
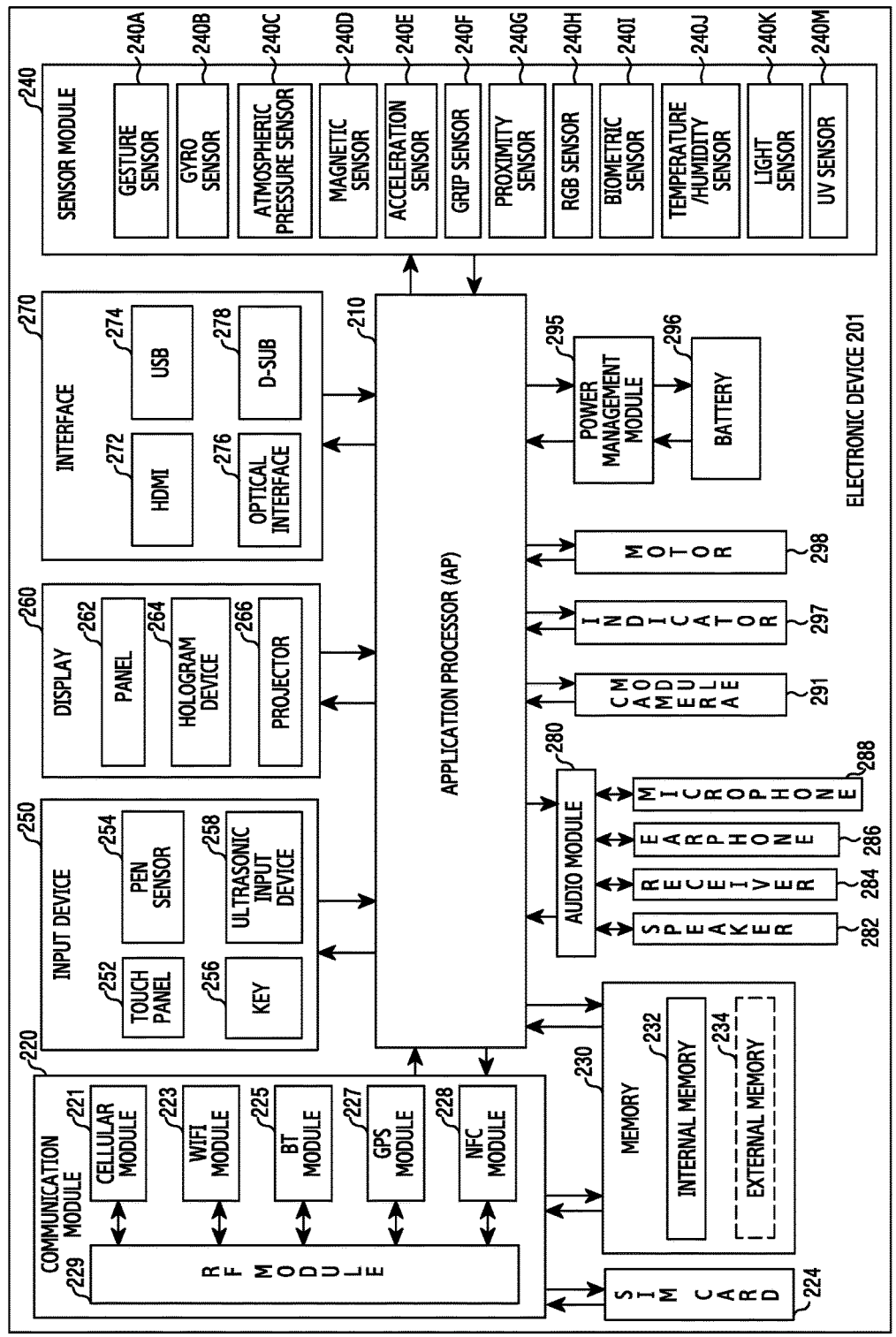
FIG. 2 is a block diagram of an electronic device according to an embodiment of the present disclosure.

FIG. 2 is a block diagram of an electronic device 201 according to an embodiment of the present disclosure. The electronic device 201 may include an entirety or part of the electronic device 101 shown in FIG. 1.

Referring to FIG. 2, the electronic device 201 may include one or more processors 210 (for example, an application processor (AP)), a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected to the processor 210 by driving an operating system or an application program, and may process and calculate various data. For example, the processor 210 may be implemented by using a system on chip (SoC). The processor 210 may further include a graphics processing unit (GPU) and/or an image signal processor. The processor 210 may include at least part of the elements shown in FIG. 2 (for example, a cellular module 221). The processor 210 may load instructions or data received from at least one of the other elements (for example, a non-volatile memory) into a volatile memory and process the instructions or data, and may store various data in the non-volatile memory.

The communication module 220 may have a same or similar configuration as that of the communication interface 170 of FIG. 1. For example, the communication module 220 may include the cellular module 221, a WiFi module 223, a BT module 225, a GPS module 227, an NFC module 228, and a radio frequency (RF) module 229.

The cellular module 221 may provide a voice call, a video call, a text service, or an Internet service through a telecommunications network. The cellular module 221 may identify and authenticate the electronic device 201 in the telecommunications network by using the SIM card 224. The cellular module 221 may perform at least some of the functions provided by the processor 210. The cellular module 221 may include a CP.

The WiFi module 223, the BT module 225, the GPS module 227, and the NFC module 228 each may include a processor for processing data received and transmitted through a corresponding module. At least some (for example, two or more) of the cellular module 221, the WiFi module 223, the BT module 225, the GPS module 227, and the NFC module 228 may be included in a single integrated chip (IC) or a single IC package.

The RF module 229 may transmit and receive communication signals, such as an RF signal. For example, the RF module 229 may include a transceiver, a power amplifier module (PAM), a frequency filter, a low noise amplifier (LNA), an antenna, etc. At least one of the cellular module 221, the WiFi module 223, the BT module 225, the GPS module 227, and the NFC module 228 may transmit and receive an RF signal through a separate RF module.

The SIM card 224 may include its unique identification information (for example, an integrated circuit card identifier (ICCID)) or subscriber information (for example, International Mobile Subscriber Identity (IMSI)).

The memory 230 (or memory 130 of FIG. 1) may include an internal memory 232 or an external memory 234. The internal memory 232 may include at least one of a volatile memory (for example, a dynamic random access memory (DRAM), a static random access memory (SRAM), a synchronous DRAM (SDRAM), and the like) a non-volatile memory (for example, a one-time programmable read only memory (OTPROM), a programmable ROM (PROM), an erasable PROM (EPROM), an electrically erasable PROM (EEPROM), a mask ROM, a flash ROM, a flash memory (for example, a NAND flash memory, a NOR flash memory, and the like), a hard drive, and a solid state drive (SSD).

The external memory 234 may further include a flash drive, for example, a compact flash (CF) drive, a secure digital (SD) memory card, a micro-SD memory card, a mini-SD memory card, an extreme digital (xD) memory card, a multi media card (MMC), a memory stick, and the like. The external memory 234 may be functionally and/or physically connected to the electronic device 201 through various interfaces.

The sensor module 240 may measure a physical quantity or detect an operation state of the electronic device 201, and may convert measured or detected information into electrical signals. The sensor module 240 may include at least one of a gesture sensor 240A, a gyro sensor 240B, a atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric 240I, a temperature/humidity sensor 240J, a light sensor 240K, and an ultraviolet light (UV) sensor 240M. Additionally or alternatively, the sensor module 240 may include an electronic nose (E-nose) sensor, an electromyography (EMG) sensor, an electroencephalogram (EEG) sensor, an electrocardiogram (ECG) sensor, an infrared ray (IR) sensor, an iris sensor, and/or a fingerprint sensor, and the like. The sensor module 240 may further include a control circuit to control at least one sensor included therein. The electronic device 201 may further include a processor configured to control the sensor module 240 as a part of the processor 210 or a separate part, and may control the sensor module 240 while the processor 210 is in a reduced power or sleep state.

The input device 250 may include a touch panel 252, a (digital) pen sensor 254, a key 256, or an ultrasonic input device 258. The touch panel 252 may use at least one of a capacitive, a resistive, an infrared, and an ultrasonic method. In addition, the touch panel 252 may further include a control circuit. The touch panel 252 may further include a tactile layer to provide a tactile response to a user.

The (digital) pen sensor 254 may be a part of the touch panel 252 or may include a separate detection sheet. The key 256 may include a physical button, an optical key, or a keypad. The ultrasonic input device 258 may detect ultrasonic waves generated in an input tool through a microphone 288, and identify data corresponding to the detected ultrasonic waves.

The display 260 (or display 160 of FIG. 1) may include a panel 262, a hologram device 264, or a projector 266. The panel 262 may have a same or similar configuration as that of the display 160 of FIG. 1. For example, the panel 262 may be implemented to be flexible, transparent, or wearable. The panel 262 may be configured as a single module along with the touch panel 252. The hologram device 264 may show a stereoscopic image in the air using the interference of light. The projector 266 may display an image by projecting light onto a screen or surface. The screen may be located internal or external to the electronic device 201. The display 260 may further include a control circuit to control the panel 262, the hologram device 264, or the projector 266.

The interface 270 may include an HDMI 272, a USB 274, an optical interface 276, or a D-subminiature connector (D-sub) 278. The interface 270 may be included in the communication interface 170 shown in FIG. 1. Additionally or alternatively, the interface 270 may include a mobile high definition link (MHL) interface, an SD card/MMC interface or an Infrared Data Association (IrDA) standard interface.

The audio module 280 may convert a sound to an electric signal and vice versa. For example, at least some elements of the audio module 280 may be included in the input and output interface 150 shown in FIG. 1. The audio module 280 may process sound information which is input or output through a speaker 282, a receiver 284, an earphone 286, or the microphone 288.

The camera module 291 is a device for photographing a still image and a moving image, and according to an embodiment of the present disclosure, the camera module 291 may include one or more image sensors (for example, a front surface sensor or a rear surface sensor), a lens, an image signal processor (ISP), or a flash (for example, a light emitting diode (LED) or a xenon lamp).

The power management module 295 may manage power of the electronic device 201. According to an embodiment of the present disclosure, the power management module 295 may include a power management IC (PMIC), a charger IC, or a battery gauge. For example, the PMIC may utilize a wire charging method and/or a wireless charging method. The wireless charging method may include a magnetic resonance method, a magnetic induction method, or an electromagnetic wave method, and an additional circuit for charging wirelessly, for example, a coil loop, a resonant circuit, a rectifier, and the like may be added. For example, the battery gauge may measure a remaining battery life of the battery 296, and a voltage, a current, or a temperature during charging. The battery 296 may include a rechargeable battery and/or a solar battery.

The indicator 297 may display a certain state of the electronic device 201 or a part of it (for example, the processor 210), for example, a booting state, a message state, or a charging state. The motor 298 may convert an electrical signal into a mechanical vibration, and cause a vibration or haptic effect. The electronic device 201 may include a processing device (for example, a GPU) for supporting a mobile TV. The processing device for supporting a mobile TV may process media data according to a standard such as a digital multimedia broadcasting (DMB) standard, a digital video broadcasting (DVB) standard, or a media flow standard.

Each of the above-described elements of the electronic device 201 according to an embodiment of the present disclosure may include one or more components, and the names of the elements may vary according to the type of the electronic device 201. The electronic device 201 according to an embodiment of the present disclosure may include at least one of the above-described elements, and some of the elements may be omitted or an additional element may be further included. In addition, some of the elements of the electronic device 201 may be combined into a single entity, and may perform the same functions as those of the elements before being combined.

Figure 3:
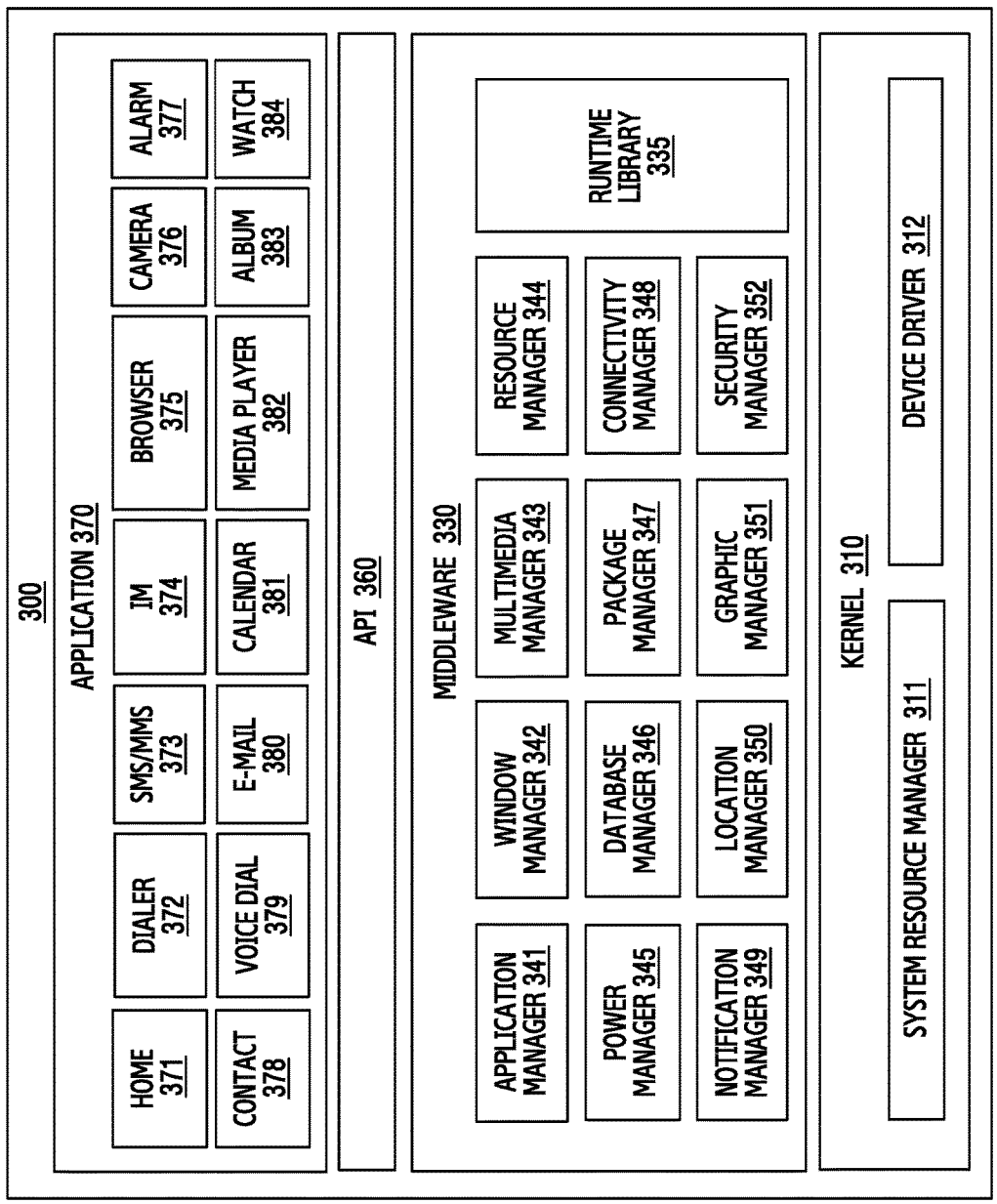
FIG. 3 is a block diagram of a program module according to an embodiment of the present disclosure.

FIG. 3 is a block diagram of a program module 300 according to an embodiment of the present disclosure. The program module 300 (or program 140 of FIG. 1) may include an OS for controlling resources related to the electronic device 101 and/or various applications, such as the application 147, driven on the OS. For example, the OS may be Android™, iOS, Windows, Symbian, Tizen™, Bada, or the like.

Referring to FIG. 3, the program module 300 may include a kernel 310, middleware 330, an API 360, and/or an application 370. At least part of the program module 300 may be preloaded on the electronic device 101 or downloaded from the first and second external devices 102, 104, the server 106, or the like.

The kernel 310 (or the kernel 141 of FIG. 1) may include a system resource manager 311 and/or a device driver 312. The system resource manager 311 may control, allocate or collect the system resources. The system resource manager 311 may include a process manager, a memory manager, a file system manager, and the like. The device driver 312 may include a display driver, a camera driver, a BT driver, a shared memory driver, a USB driver, a keypad driver, a WiFi driver, an audio driver, or an inter-process communication (IPC) driver.

The middleware 330 may provide functions which are commonly required by the application 370 or may provide various functions to the application 370 through the API 360 such that the application 370 can effectively use limited system resources in the electronic device 101. The middleware 330 (or the middleware 143 of FIG. 1) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module which is used by a compiler to add a new function through a programming language while the application 370 is executed. The runtime library 335 may perform functions on input/output management, memory management, arithmetic, and the like.

The application manager 341 may manage a life cycle of at least one of the applications in the application 370, for example. The window manager 342 may manage graphical user interface (GUI) resources used in a screen. The multimedia manager 343 provides a format necessary for reproducing various media files and encodes or decodes the media files by using a coder/decoder (codec) suited to the corresponding format. The resource manager 344 may manage resources such as source code, memory, or storage space for at least one of the applications in the application 370.

The power manager 345 operates along with a basic input/output system (BIOS) to manage a battery or power and provide power information necessary for operations of the electronic device 101. The database manager 346 may generate, search, or change a database which is used in at least one of the applications in the application 370. The package manager 347 may manage installation or updating of an application which is distributed in the form of a package file.

The connectivity manager 348 may manage wireless connections utilizing WiFi, BT, and the like. The notification manager 349 may display or notify a user of an event such as an arrival of a message, an appointment, a notification of proximity in such a manner that the event does not hinder the user. The location manager 350 may manage location information of the electronic device 101. The graphic manager 351 may manage a graphic effect to be provided to a user or a relevant user interface. Herein, the graphic manager 351 may include a DALi graphic engine. The security manager 352 may provide an overall security function necessary for system security or user authentication. According to an embodiment of the present disclosure, when the electronic device 101 is equipped with a telephony function, the middleware 330 may further include a telephony manager to manage a speech or video telephony function of the electronic device 101.

The middleware 330 may include a middleware module to perform a combination of the various functions of the above-described elements. The middleware 330 may provide a module which is customized according to a type of OS to provide a distinct function. In addition, the middleware 330 may dynamically delete some of the existing elements or may add new elements.

The API 360 (or the API 145 of FIG. 1) is a set of API programming functions and may be provided in a different configuration according to an OS. For example, in the case of Android™ or iOS, a single API set may be provided for each platform. In the case of Tizen™, two or more API sets may be provided for each platform.

The application 370 (or the application 147 of FIG. 1) may include one or more applications for providing functions, such as a home application 371, a dialer application 372, a short message service (SMS)/multimedia messaging service (MMS) application 373, an instant message (IM) application 374, a browser application 375, a camera application 376, an alarm application 377, a contacts application 378, a voice dial application 379, an email application 380, a calendar application 381, a media player application 382, an album application 383, and a watch or clock application 384, and may also include a health care function (for example, measuring an amount of exercise or a blood sugar level), or providing environmental information (for example, information on atmospheric pressure, humidity, or temperature).

According to an embodiment of the present disclosure, the application 370 may include an application for supporting information exchange between the electronic device 101 and the first and/or second external electronic device 102 and 104 (hereinafter, an "information exchange application"). The information exchange application may include a notification relay application for relaying certain information to an external electronic device or a device management application for managing an external electronic device.

The notification relay application may include a function for relaying notification information generated by other applications of the electronic device 101 (such as the SMS/MMS application 373, the email application 380, the health care application, the environment information application, and the like) to the first and/or second external electronic devices 102 and 104). In addition, the notification relay application may receive notification information from an external electronic device and may relay the same to a user.

The device management application may manage (i.e., install, delete or update) at least one function of the second external electronic device 104 communicating with the electronic device 101 (for example, turning on/off an external electronic device (or some parts) or adjusting brightness (or resolution) of a display), an application operating in the second external electronic device 104, or a service provided by the second external electronic device 104 (for example, a calling service or a message service).

Figure 4:
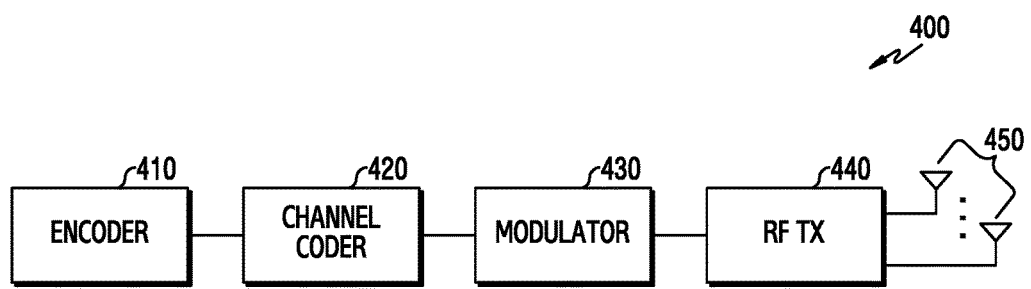
FIG. 4 is a block diagram of a transmitter according to an embodiment of the present disclosure.

FIG. 4 is a block diagram of a transmitter 400 according to an embodiment of the present disclosure.

Referring to FIG. 4, the transmitter 400 may include an encoder 410, a channel coder 420, a modulator 430, an RF transmitter (RF TX) 440, and an antenna 450.

The encoder 410 may encode input data. The encoder 410 may perform encoding to reduce the amount of the input data to facilitate storage and facilitate communication. For example, if data input to the encoder 410 is voice data, the encoder 410 may be a coder of a Qualcomm code-excited linear prediction (QCELP), an adaptive multi-rate narrow band (AMR-NB), or adaptive multi-rate wideband (AMR-WB) scheme.

The channel coder 420 may perform channel coding for input data in order to reduce errors due to noise or fading generated in a communication environment. The channel coder 420 may perform channel coding for each channel. In this case, a channel may be a traffic channel for transmitting voice or data, a control channel for transmitting control data, etc. The channel coder 420 may be a convolutional coder, a turbo coder, etc. In addition, the channel coder 420 may perform channel coding in units of one TTI. One TTI may be denoted differently in accordance with a communication system. For example, in an LTE system, 1 TTI may be one frame (i.e., 10 milliseconds (ms)). Alternatively, in a WCDMA system, 1 TTI may be one radio frame (i.e., 10 ms). The channel coder 420 may output symbols corresponding to input bits based on a code rate. For example, when the code rate is ½, the number of symbols output from the channel coder 420 may be two times the number of the input bits.

The modulator 430 may perform modulation based on a modulation scheme in accordance with a communication system. For example, the modulator 430 may be a modulator of CDMA, WCDMA, an orthogonal scheme (for example, orthogonal frequency division multiplexing (OFDM)), or a non-orthogonal scheme (for example, filter bank multi-carrier (FBMC)), etc.

The RF TX 440 may up-convert a modulated transmission signal into an RF band. In addition, the RF TX 440 may amplify the transmission power of a signal.

The antenna 450 may include one or more antennas. In addition, the antenna 450 may be configured for a multiple input multiple output (MIMO) technique as well.

Figure 5:
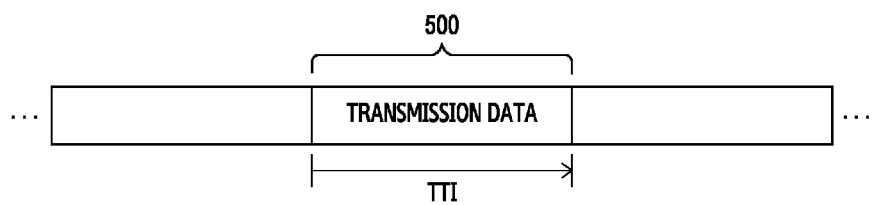
FIG. 5 illustrates transmission data in one TTI according to an embodiment of the present disclosure.

FIG. 5 illustrates transmission data 500 in 1 TTI according to an embodiment of the present disclosure.

Referring to FIG. 5, the transmission data 500 may be data output from the channel coder 420 of FIG. 4. For example, a convolutional coder may generate n coded data or symbols for k inputs. In this case, the code rate may be k/n. In addition, a coded data or symbol may be determined by a constraint length K as well as k. The constraint length K may indicate the total number of inputs in the output. Furthermore, the constraint length K may indicate a total length of a memory in which data having influence are stored. For example, when the number of registers is m, the constraint length K may be m+1 (i.e., K=m+1). That is, when the constraint K is equal to 7 (i.e., K=7), it may indicate performing convolution by a 6-bit register and 1 bit of input data. Accordingly, a convolutional coder of a 1/M code rate may receive 1 bit of input data and generate M bits of coded data. Moreover, this operation may be carried out by performing time-convolution for input information data using a generating function.

In FIG. 5, the transmission data 500 may be an output of the channel coder 420 of FIG. 4. The transmission data 500 may include more symbols than data bits based on a code rate. For example, the transmission data 500 of a ⅓ code rate may include 3 symbols for each bit of data. Accordingly, although only a part of the transmission data 500 may be received, a device receiving the transmission data 500 may succeed in decoding the transmission date 500.

Figure 6:
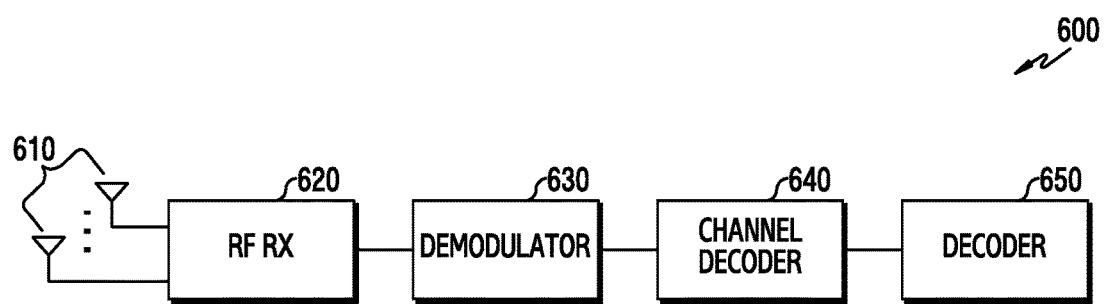
FIG. 6 is a block diagram of a receiver according to an embodiment of the present disclosure.

FIG. 6 is a block diagram of a receiver 600 according to an embodiment of the present disclosure.

Referring to FIG. 6, the receiver 600 may include an antenna 610, an RF receiver (RF RX) 620, a demodulator 630, a channel decoder 640, and a decoder 650.

The antenna 610 may include one or more antennas. In addition, the antenna 610 may also be configured for a MIMO technique. Furthermore, the antenna 610 may receive a signal from a transmitter (for example, the transmitter 400 of FIG. 4).

The RF RX 620 may amplify a received RF signal with an LNA and then, down-convert the RF signal into a baseband signal.

The demodulator 630 may demodulate a received signal with respect to its modulation scheme (for example, CDMA, WCDMA, an orthogonal scheme (for example, OFDM), or a non-orthogonal scheme (for example, FBMC), etc.).

The channel decoder 640 may perform channel decoding for each channel. In addition, the channel decoder 640 may perform the channel decoding in a unit of data corresponding to 1 TTI. The channel decoder 640 may be a Viterbi decoder or a turbo decoder.

The decoder 650 may decode coded data (i.e., channel-decoded received encoded data). If the decoded data is voice, an output of the decoder 650 may be reproduced through a speaker.

Generally, an electronic device comprising a communication function may perform decoding after receiving all of a plurality of unit-sectioned data corresponding to an encoded TTI. For the sake of reducing power consumption of the electronic device, if it is determined that a quality of a received signal is good (for example, if a channel state is good), the electronic device may attempt decoding even when receiving only partial data. However, in attempting to decode partial data, the electronic device may incorrectly determine that the attempt is successful, despite the fact that there is an error in the decoding. In addition, the result of the attempt may be forwarded to an upper layer, causing another error.

Various embodiments of the present disclosure describe an electronic device and method capable of performing decoding before receiving all data corresponding to a TTI. Also, various embodiments of the present disclosure describe an apparatus and method for performing decoding before receiving all data, and again decoding data including a set amount of data (i.e., unit-section data) if partial decoding (i.e., early decoding) succeeds, for the sake of reliability judgment, to decrease a generable false alarm probability.

Figure 7:
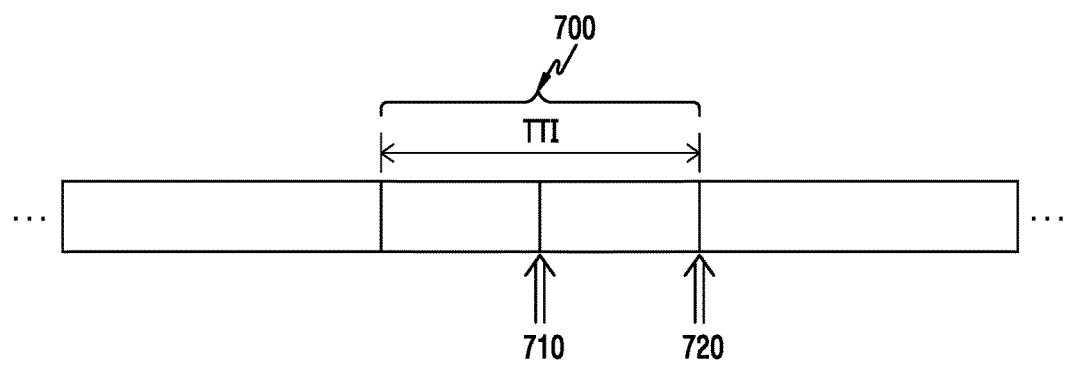
FIG. 7 illustrates data in one TTI according to an embodiment of the present disclosure.

FIG. 7 illustrates data in one TTI according to an embodiment of the present disclosure.

Referring to FIG. 7, data 700 may be data input to the channel decoder 640 of FIG. 6. The data 700 may be voice data. The data 700 may include more symbols than data bits based on a code rate. For example, if the code rate is ⅓, the data 700 may include 3 symbols corresponding to the same data bit.

Generally, the receiver 600 of FIG. 6 may decode the data 700 at a point in time (for example, a time point 720) at which all of the data 700 are received. However, because the data 700 includes more symbols than data bits based on the code rate, it may be inefficient to wait to receive all of the data 700 before performing decoding of the data 700.

Accordingly, an electronic device and a method according to various embodiments of the present disclosure may complete decoding before receiving all of the data (for example, the data 700) corresponding to 1 TTI, and may not receive the remaining data. In addition, an electronic device and a method according to various embodiments of the present disclosure may complete decoding numerous times before receiving all of the data (for example, the data 700) corresponding to 1 TTI, thereby increasing the decoding success rate. Accordingly, an electronic device and method according to various embodiments of the present disclosure may reduce power consumption based on decoding having a high success rate and efficient data reception.

Figure 8:
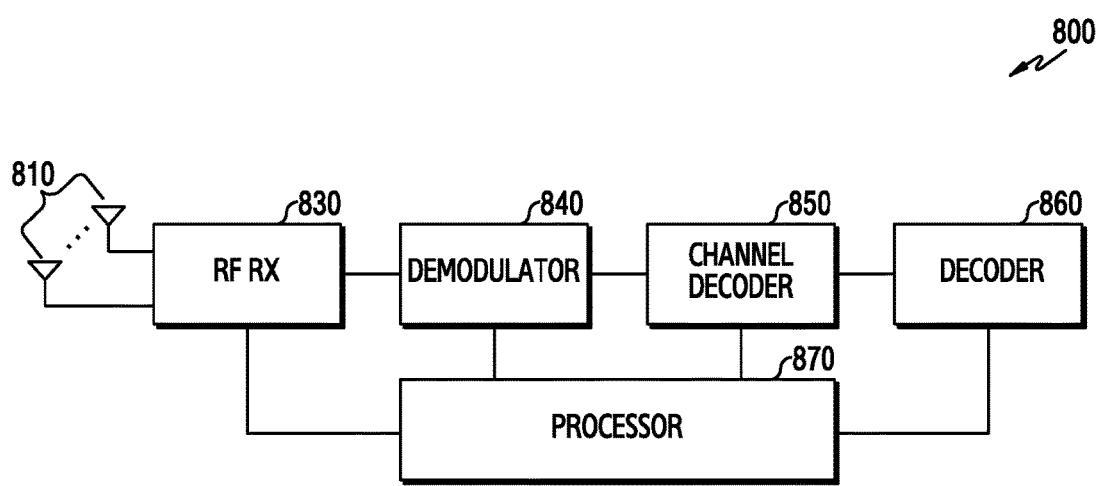
FIG. 8 is a block diagram of an electronic device according to an embodiment of the present disclosure.

FIG. 8 is a block diagram of an electronic device 800 according to an embodiment of the present disclosure.

Referring to FIG. 8, the electronic device 800 may include an antenna 810, an RF RX 830, a demodulator 840, a channel decoder 850, a decoder 860, and a processor 870.

The antenna 810 may include one or more antennas. In addition, the antenna 810 may be configured for a MIMO technique. Furthermore, the antenna 810 may receive a signal from an electronic device such as a transmitter (for example, the transmitter 400 of FIG. 4), etc.

The RF RX 830 may amplify a received RF signal using a low noise amplifier and then, down-convert the RF signal into a baseband signal.

The demodulator 840 may demodulate a signal down-converted by the RF RX 830. The demodulator 840 may demodulate the input signal with respect to its modulation scheme. The modulation scheme may include CDMA, WCDMA, an orthogonal scheme (for example, OFDM), or a non-orthogonal scheme (for example, FBMC), etc.

The channel decoder 850 may decode demodulated data. The demodulated data may include a plurality of symbols corresponding the same data bit based on a code rate. The channel decoder 850 may be a Viterbi decoder or a turbo decoder.

The channel decoder 850 may perform decoding by distinguishing received data by channel. In this case, the data received by a channel may be data of a control channel, a broadcasting channel, a voice channel, etc. That is, the channel decoder 850 may decode data in different modes, respectively, in accordance with the type of the data.

The channel decoder 850 may include a decoder and a checker for performing a cyclic redundancy check (CRC). The channel decoder 850 may decode 1 TTI of channel-coded data. In addition, the channel decoder 850 may divide the decoded data by a CRC polynomial used during transmission, and determine a CRC error or non-error in decoding. The occurrence of a CRC error may indicate that an error exists in the decoding. The non-occurrence of a CRC error may indicate success of decoding.

The channel decoder 850 according to various embodiments of the present disclosure may decode channel-coded data in the following method.

The channel decoder 850 may perform normal decoding. Normal decoding may indicate decoding carried out after completing the reception of data corresponding to 1 TTI.

The channel decoder 850 may perform partial decoding. The partial decoding may indicate decoding carried out before completing the reception of data corresponding to 1 TTI. For example, the channel decoder 850 may partial-decode a part of the data 700 at a point in time 710 of the data 700 corresponding to 1 TTI. If the channel decoder 850 performs partial decoding, a portion of data, which is not received during the 1 TTI, may be occupied or filled with an erasure (e.g. 0 bits). Accordingly, a partial decoding may decode data including a partial section of data constituting 1 TTI where the remaining data is filled with an erasure. If necessary, the data portion not received during the 1 TTI may be filled with 1 bits as well.

The channel decoder 850 may perform complementary decoding. Complementary decoding may indicate decoding carried out to guarantee success of partial decoding after the partial decoding succeeds. Complementary decoding may be, if necessary, performed repeatedly (e.g. at least once). In addition, complementary decoding may be carried out for a unit section of data added to data that has been partially decoded, after the partial decoding succeeded. A unit section of data may be different for different communication systems. For example, if the communication system is a WCDMA system, the unit section may be one slot (e.g. 0.667 ms). In addition, a unit section may include a plurality of slots. That is, a unit section may be changed based on the communication environment, a user's setting, the type of signal, etc. In the case where the channel decoder 850 performs complementary decoding, the channel decoder 850 may decode including the data of a unit section in the data of a section performing the partial decoding, within a 1 TTI. In this case, a data portion that has not been received may be filled with an erasure (e.g. 0 bits). Accordingly, the channel decoder 850 may complementary-decode, data of a unit section including data of a partial section constituting 1 TTI, where a non-received data portion is filled with an erasure. The data portion not received during 1 TTI may also be filled with is. That is, when decoding a non-received data portion, the channel decoder 850 may insert a certain value into the non-received data portion and decode the resulting non-received data portion.

The demodulator 840 or the channel decoder 850 may include a buffer. The buffer may perform a function of temporarily storing demodulated data. The buffer may temporarily store data corresponding to 1 TTI.

The decoder 860 may perform normal decoding of encoded data. In addition, the decoder 860 may perform decoding of partially encoded data. Furthermore, the decoder 860 may perform source decoding of complementarily encoded data. The decoder 860 may be a voice decoder.

If the demodulator 840 demodulates data of a set amount or more within 1 TTI, the channel decoder 850 may execute partial decoding. In addition, if the partial decoding terminates, the channel decoder 850 may determine success or failure of the partial decoding through a CRC check. If the partial decoding succeeds, the channel decoder 850 may perform complementary decoding, including data of a unit section in the partially decoded demodulation data. The channel decoder 850 may perform a CRC check on the complementarily decoded data and determine success or failure of the complementary decoding. If it is determined that the complementary decoding succeeds, the channel decoder 850 may forward the decoded data to the decoder 860.

In this case, the term "TTI" may indicate an encoder TTI for transmitting data encoded in a channel coder (for example, the channel coder 420 of FIG. 4). The term "unit section" may indicate a section constituting a TTI. One TTI may include a plurality of unit section data. For example, a unit section may be a slot.

The term "normal decoding" may indicate decoding carried out by a channel decoder when the channel decoder receives all of the data corresponding to 1 TTI. Partial decoding may represent decoding carried out by a channel decoder when data of set unit sections are received within 1 TTI. For example, partial decoding may be decoding carried out when data corresponding to ½ TTI is received. The term "complementary decoding" may indicate decoding carried out that includes data of a unit section in partially decoded data, after successfully performing partial decoding (for example, after performing partial decoding, determining that the partial decoding succeeded through a CRC check). For example, after succeeding in partial decoding, the channel decoder 850 may perform complementary decoding including data of a unit section in ½ TTI data.

Partial decoding may be carried out for coded data of a voice channel. In this case, the channel decoder 850 may be a channel decoder of a voice channel. If the set amount of channel-coded voice data is received (for example, a data amount corresponding to ½ TTI), the channel decoder 850 may partially decode the received voice data. In addition, for the sake of determining the reliability of a partial decoding, the channel decoder 850 may further add data corresponding to a unit section to the partially decoded voice data and perform complementary decoding of the resulting data.

The processor 870 may be implemented as a system on chip (SoC). In addition, the processor 870 may be, separated and coupled with internal constituent elements (for example, the RF RX 830, the demodulator 840, the channel decoder 850, the decoder 860, etc.) of the electronic device 800.

The processor 870 may receive instructions from other constituent elements (for example, the RF RX 830, the demodulator 840, the channel decoder 850, the decoder 860, etc.), may interpret the received instructions, and may perform a determination in accordance with the interpreted instructions or process data.

The processor 870 may include a channel state decision module, a decoding mode decision module, a decoding reliability decision module, an operation control module, etc.

Figure 9:
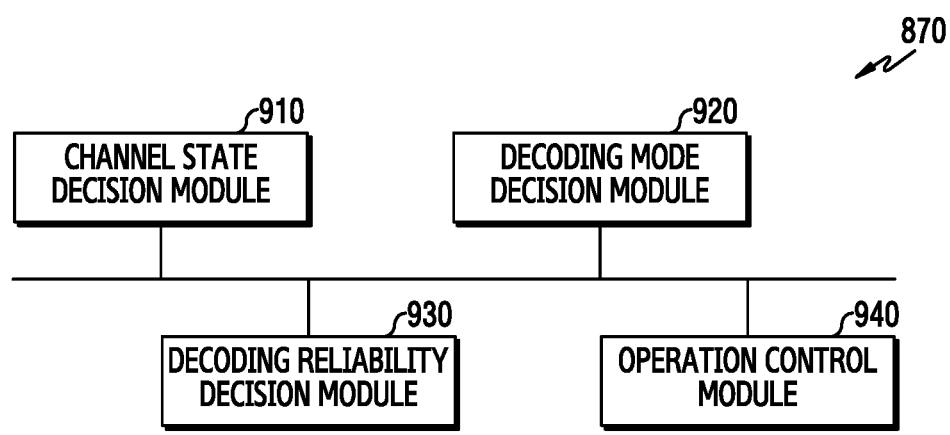
FIG. 9 is a block diagram of a processor according to an embodiment of the present disclosure.

FIG. 9 is a block diagram of a processor according to an embodiment of the present disclosure.

Referring to FIG. 9, the processor 870 may include a channel state decision module 910, a decoding mode decision module 920, a decoding reliability decision module 930, and an operation control module 940.

The channel state decision module 910 may determine a channel state based on a signal that the electronic device 800 of FIG. 8 receives. For example, the channel state decision module 910 may calculate one or more of a signal to interference and noise ratio (SINR) or a carrier to interference and noise ratio (CINR) based on a signal (for example, a pilot signal, etc.) that the electronic device 800 receives. The channel state decision module 910 may determine the channel state based on one or more calculated information. In addition, the channel state decision module 910 may determine the channel state by analyzing a strength of a received signal output from a received signal strength indicator (RSSI) receiver. The channel state decision module 910 may forward channel state information to the decoding mode decision module 920.

The decoding mode decision module 920 may determine a decoding mode of received data. The decoding mode may include normal decoding, partial decoding, and complementary decoding. The decoding mode decision module 920 may receive information about the type of signal received through the demodulator 840, etc.

The decoding mode decision module 920 may determine a decoding mode based on channel state information provided from the channel state decision module 910 and the type of received signal. For example, if the channel state decision module 910 determines that a channel state is good, the decoding mode decision module 920 may control the channel decoder 850 of FIG. 8 to decode demodulated data in a partial decoding mode in order to reduce power consumption. In addition, if it is determined that there is a need to guarantee the reliability of a partial decoding, the decoding mode decision module 920 may control the channel decoder 850 to perform complementary decoding in addition to partial decoding.

If the electronic device 800 performs partial decoding, the decoding mode decision module 920 may determine a partial decoding start time based on a code rate, the type of received data, and/or channel state information provided from the channel state decision module 910. The partial decoding start time may be a point in time at which the amount of data received within 1 TTI reaches a target amount. The target amount may be an amount of data capable of succeeding in partial decoding when performing partial decoding.

In the case where the electronic device 800 performs complementary decoding, the decoding mode decision module 920 may determine a unit section for the complementary decoding based on a code rate, the type of received data, and/or channel state information provided from the channel state decision module 910.

The decoding reliability decision module 930 may determine the reliability of a partial decoding based on the partial decoding result.

The decoding reliability decision module 930 may set a complementary decoding count. The complementary decoding count may be a value predefined in the electronic device 800. The complementary decoding count may be different value for different types of signal and for different received signal strengths. For example, if demodulating and channel-decoding a signal received in a good channel state, the complementary decoding count may have a relatively low value. Otherwise, if a signal is received in a channel satisfying a set condition (for example, a condition higher than a threshold value) but not satisfying a setting for a good condition, the complementary decoding count may have a relative high value. The channel decoder 850 may perform complementary decoding based on the complementary decoding count provided by the decoding reliability decision module 930.

The decoding reliability decision module 930 may determine the success or failure of decoding. The decoding reliability decision module 930 may determine the success or failure of decoding based on a CRC check.

The operation control module 940 may control operations of the RF RX 830, the demodulator 840, the channel decoder 850, the source decoder 860, etc.

The operation control module 940 may determine the maintenance or non-maintenance of complementary decoding based on a decoding success count. In addition, the operation control module 940 may determine the maintenance or non-maintenance of decoding based on a preset threshold count and a complementary decoding success count. For example, if the threshold count is 5, for example, the operation control module 940 may control the channel decoder 850 to perform complementary decoding until the complementary decoding succeeds five times in succession. If the complementary decoding success count satisfies a set count, the operation control module 940 may terminate channel decoding (for example, terminating a channel decoding of the remaining data of a TTI section) of the channel decoder 850, and forward the channel decoding result to the source decoder 860.

The operation control module 940 may control the RF RX 830 to terminate receiving data corresponding to a remaining section of 1 TTI in accordance with success of a partial decoding or success of a complementary decoding. For example, if, for example, 1 TTI is composed of 15 slots (e.g. slot 0 to slot 14), and partial decoding starts at the slot 8, and a complementary decoding count is 2. In this case, if data of up to the slot 8 is demodulated, the channel decoder 850 may perform partial decoding. In addition, if it is determined that the partial decoding succeeds, the channel decoder 850 may perform a first complementary decoding of data in slot 9 at a demodulation point in time point. Furthermore, the channel decoder 850 may perform a second complementary decoding of data in slot 10 at a demodulation point in time point. Moreover, if it is determined that both of the 2 complementary decoding results succeed, the operation control module 940 may terminate a channel decoding operation of the channel decoder 850, and control the RF RX 830 to terminate receiving the remaining slots of data (for example, slot 11 to slot 14). In addition, the operation control module 940 may control the RF RX 830 to resume reception of data at a next TTI.

The operation control module 940 may control the performance of the RF RX 830 based on a decoding mode. For example, if the decoding mode is a normal decoding mode, the operation control module 940 may control the RF RX 830 to operate in a high signal quality mode in order to guarantee a good signal quality (for example, a low block error rate (BLER)). The high signal quality mode may be a mode of processing only a signal having an error vector magnitude (EVM) exceeding a predetermined threshold magnitude. Otherwise, if the decoding mode is a partial or complementary decoding mode, the operation control module 940 may control the RF RX 830 to operate in an operation mode that consumes less power (hereinafter, referred to as a "low signal quality mode"). The low signal quality mode may be a mode of processing a signal having an error vector magnitude less than the predetermined threshold magnitude.

Figure 10:
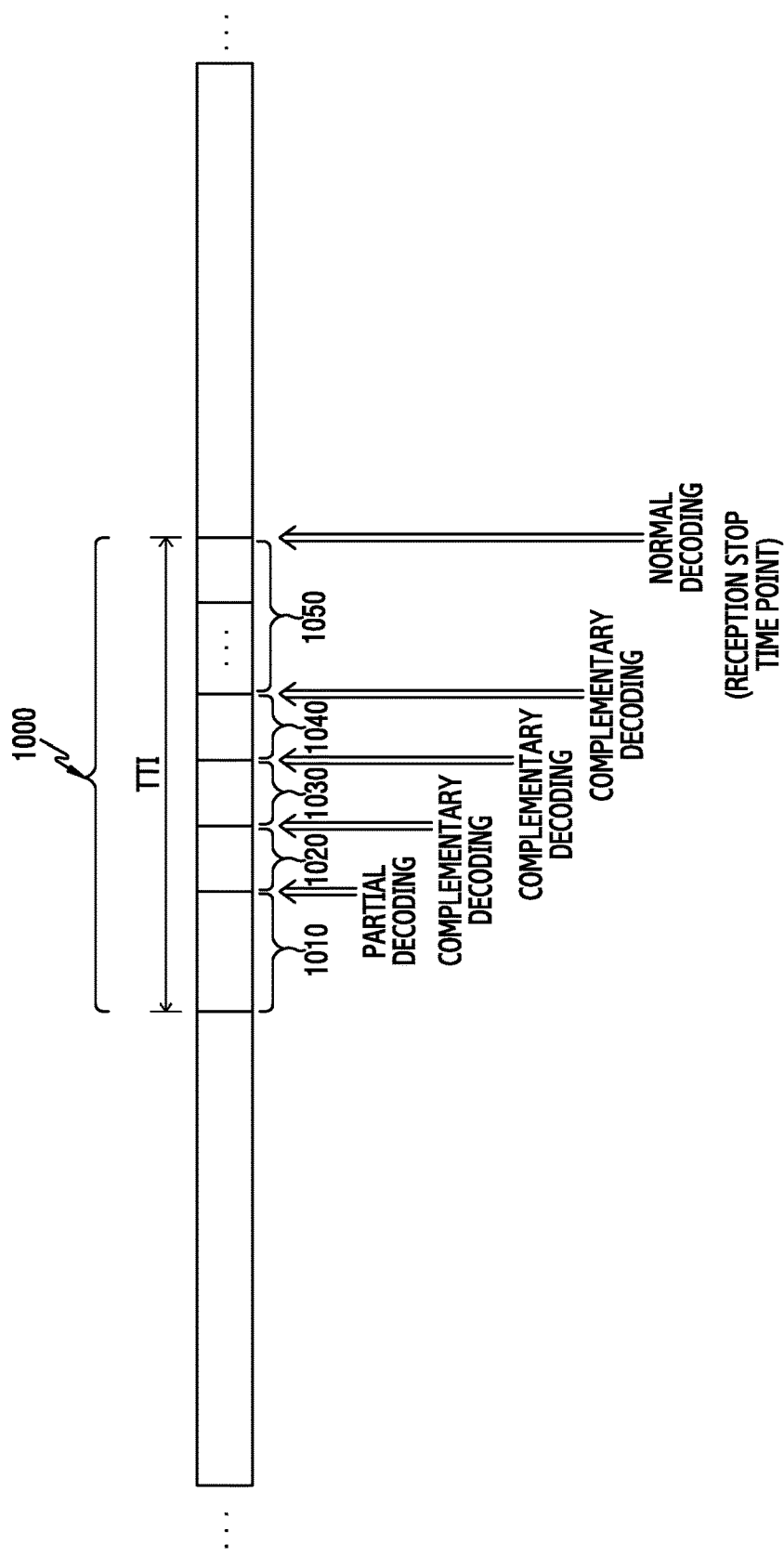
FIG. 10 is a timing diagram of partial decoding and complementary decoding according to an embodiment of the present disclosure.

FIG. 10 is a timing diagram of partial decoding and complementary decoding according to an embodiment of the present disclosure.

Referring to FIG. 10, data 1000 may be data corresponding to 1 TTI (i.e., data of an encoder TTI being channel-coded in a channel coder of a transmitter). One TTI may include a plurality of unit sections.

If data 1010 is received, the electronic device 800 of FIG. 8 may perform partial decoding of the data 1010. Because the channel coded data is data that is coded to have a plurality of coded data or symbols for 1 bit of data, the decoding may succeed even though a signal (for example, the data 1000) is not completely received. In this case, the electronic device 800 may not receive data 1020, data 1030, data 1040, or data 1050. Accordingly, by performing partial decoding of the data 1010, the electronic device 800 may reduce a decoding load more than normal decoding, and reduce power consumption.

Otherwise, after performing partial decoding, the electronic device 800 may perform complementary decoding to guarantee the reliability of the partial decoding. Complementary decoding may be carried out several times as illustrated in FIG. 10. If the data 1020 is received, the electronic device 800 may perform complementary decoding of the data 1010 and the data 1020. By performing complementary decoding, the electronic device 800 may guarantee a higher decoding reliability than partial decoding can.

To guarantee higher decoding reliability, the electronic device 800 may perform complementary decoding of the data 1010, the data 1020, and the data 1030. In addition, the electronic device 800 may perform complementary decoding of the data 1010, the data 1020, the data 1030, and data 1040. Complementary decoding may involve a large amount of data compared to partial decoding, but may guarantee the reliability of decoding. For example, if the electronic device 800 incorrectly determines that partial decoding is successful, the electronic device 800 may forward an unwanted information bit to an upper layer. However, by performing complementary decoding, the electronic device 800 may reduce an error of an information bit. In addition, in the case where performing complementary decoding, the electronic device 800 may not receive data 1050 and thus, the electronic device 800 may reduce power consumption as compared to normal decoding (e.g. decoding of the data 1000).

Figure 11:
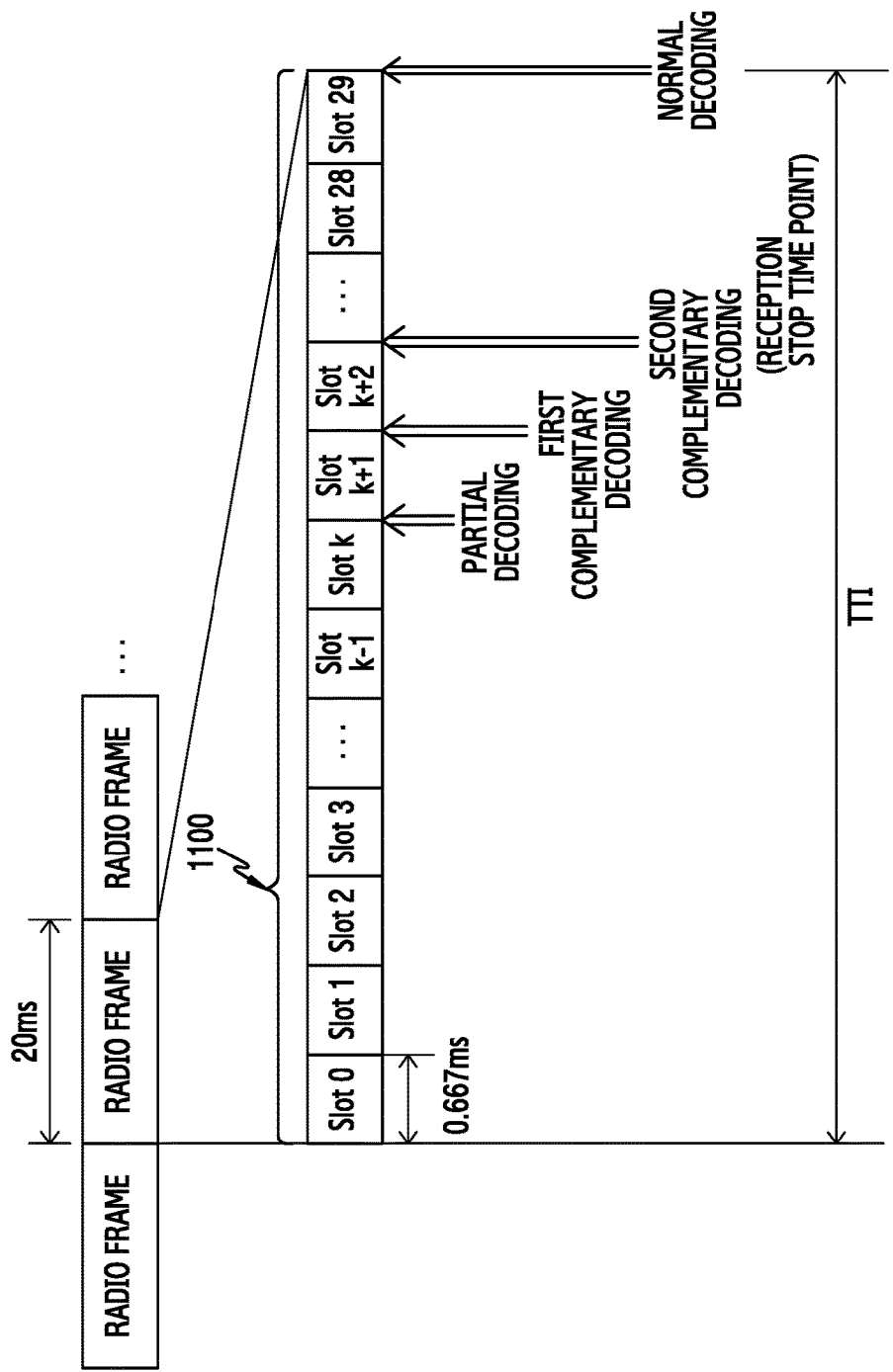
FIG. 11 is a timing diagram of partial decoding and complementary decoding in a Wideband Code Division Multiple Access (WCDMA) system according to an embodiment of the present disclosure.

FIG. 11 is a timing diagram of partial decoding and complementary decoding in a WCDMA system according to an embodiment of the present disclosure.

Referring to FIG. 11, data 1100 may be, for example, 1 TTI frame of WCDMA. One TTI frame may include 30 slots. One TTI frame may have a length of 20 ms, and the 30 slots may each have a length of 0.667 ms. In addition, the data 1100 may be voice data.

If data corresponding to slot 0 to slot k is received, the electronic device 800 of FIG. 8 may perform partial decoding of the received data. The partial decoding may succeed even though all of the data (for example, a signal corresponding to 1 TTI) is not received. This is because the data being an object of the partial decoding is data encoded according to a code rate. In this case, the electronic device 800 may not receive data corresponding to slot k+1 to slot 29. Accordingly, the electronic device 800 may reduce a decoding load more than when decoding (e.g. normal decoding) data 1100 corresponding to one radio frame, and may reduce power consumption.

If partial decoding succeeds, the electronic device 800 may perform a first complementary decoding in order to guarantee the reliability of the partial decoding. If data corresponding to slot k+1 is received, the electronic device 800 may perform a first complementary decoding of the data corresponding to slot 0 to slot k+1. By performing the first complementary decoding, the electronic device 800 may guarantee a higher decoding reliability than by performing the partial decoding.

Otherwise, if the partial decoding fails, the electronic device 800 may perform the first complementary decoding in order to reduce power consumption. In addition, the electronic device 800 may perform a second complementary decoding in order to guarantee the reliability of the first complementary decoding. That is, even though the partial decoding fails, the electronic device 800 may reduce power consumption through the first complementary decoding, and guarantee a reliability of decoding through the second complementary decoding.

In the case where data loss must be minimized or in the case where a high signal quality is required, the electronic device 800 may perform normal decoding. In this case, the electronic device 800 may perform normal decoding of data 1100 corresponding to 1 TTI (e.g. data 1100 corresponding to slot 0 to slot 29).

That is, the electronic device 800 may perform decoding in various modes (for example, a normal decoding mode, a partial decoding mode, or a complementary decoding mode) in consideration of power consumption and decoding efficiency.

An electronic device 800 according to the above various embodiments of the present disclosure may include a processor configured to execute instructions, a receiver operatively coupled with the processor, and a channel decoder operatively coupled with the processor, wherein the processor is configured to decode first data wherein an amount of the first data received within one TTI reaches a target amount. If decoding of the first data succeeds, decode the second data that includes the first data and data additionally received during a unit section within the one TTI. If decoding of the second data succeeds, transmit the decoded second data, and terminate decoding of the data received after the second data within the one TTI. The processor may be further configured to, if decoding of the second data succeeds, terminate receiving data after receiving the second data within the one TTI.

Furthermore, the processor can be further configured to check a channel state, and if the channel state is good, initiate decoding of the first data, wherein the processor is configured to check the channel state based on at least one of an SINR, a CINR, and a received signal strength (RSS).

Furthermore, the target amount may correspond to some unit sections from among a plurality of unit sections configuring one TTI.

Furthermore, the processor can be further configured to, if decoding of the first data fails, decode the second data in order to perform complement decoding of the first data, and, if decoding of the second data succeeds, decode the third data that includes the second data and data additionally received during the unit section within one TTI.

Furthermore, the processor can be configured to decode the first data by inserting a certain value into the remaining data except the first data from among data of one TTI, and decode the second data by inserting the certain value into the remaining data except the second data from among the data of one TTI.

Furthermore, the processor can be configured to determine whether decoding of the first data succeeds or not by using CRC included in the first data.

Furthermore, the received data may be voice data. The electronic device 800 can further include a decoder, wherein the decoder is a voice decoder, and wherein the processor is configured to, if decoding of the second data succeeds, transmit the decoded second data to the decoder.

Figure 12:
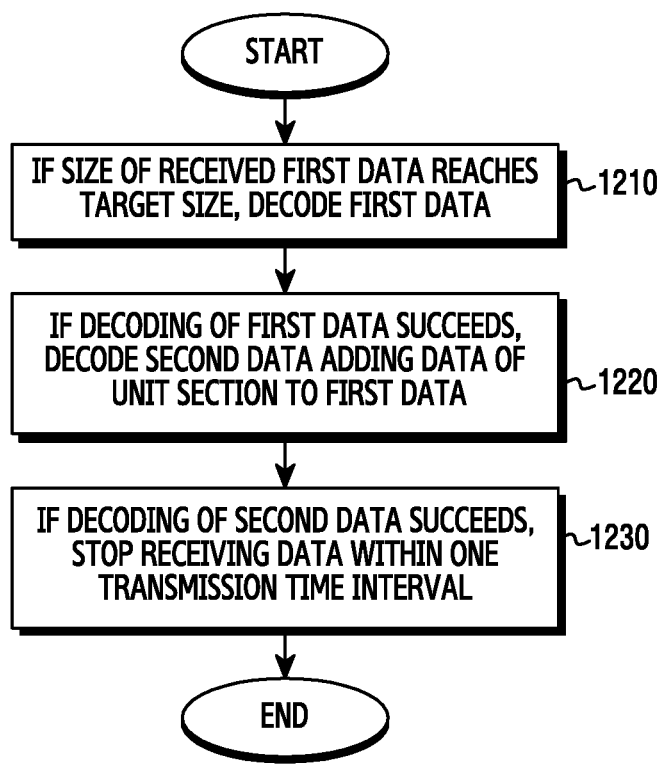
FIG. 12 is a flowchart of a method of an electronic device according to an embodiment of the present disclosure.

FIG. 12 is a flowchart of a method of an electronic device according to an embodiment of the present disclosure.

Referring to FIG. 12, in step 1210, if an amount of a first data received within one TTI reaches a target amount, the electronic device 800 may decode the first data. The decoding may be a partial decoding. The first data may represent data received up to the start time of a partial decoding. Accordingly, the target amount may be set as an amount that causes the least decoding error when partial decoding is carried out for data of 1 TTI. The target amount may be set according to a state of a received channel (e.g. an environment of the channel). In step 1210, the electronic device 800 may insert data (e.g. all 0s or all 1s) having a certain value into the remaining section except the first data in 1 TTI data section and perform decoding of the resulting data. Step 1210 may be carried out by one or more of the channel decoder 850 or the processor 870 illustrated in FIG. 8.

In step 1220, the electronic device 800 may determine the success or failure of the decoding by a CRC check of the decoding result of the first data. While decoding the first data, the electronic device 800 may receive and demodulate data of a next slot section constituting the data corresponding to 1 TTI. If decoding of the first data succeeds, the electronic device 800 may decode the second data, adding the data of the next unit section to the first data. For example, the second data may include the data 1010 and the data 1020 of FIG. 10. In addition, the second data may include data corresponding to slot 0 to slot k+1 of FIG. 11. Accordingly, decoding the second data may represent complementary decoding. Step 1220 may be carried out by one or more of the channel decoder 850 or the processor 870 illustrated in FIG. 8.

In step 1230, the electronic device 800 may determine success or failure of the decoding of the second data. If decoding of the second data succeeds, the electronic device 800 may terminate receiving data within 1 TTI. Accordingly, the electronic device 800 may terminate receiving data for performing complementary decoding up to the lapse of 1 TTI. After 1 TTI lapses, the electronic device 800 may resume data reception. Step 1230 may be carried out by one or more of the channel decoder 850 or the processor 870 illustrated in FIG. 8.

By performing step 1210 to step 1230, the electronic device 800 may complete decoding sooner. In addition, by performing step 1210 to step 1230, the electronic device 800 may consume less power, because of not receiving a partial signal within 1 TTI.

Figure 13:
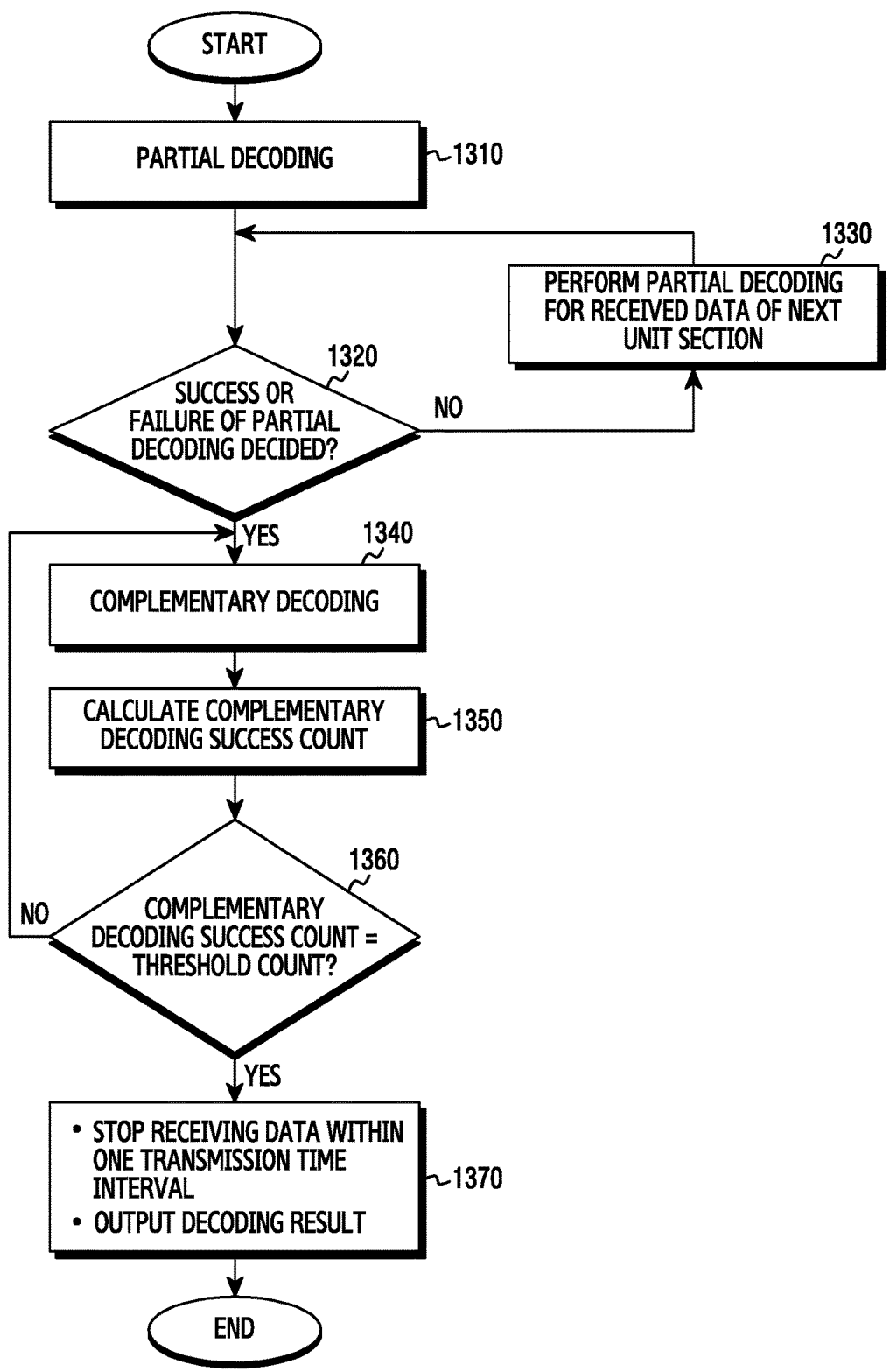
FIG. 13 is a flowchart of a method of an electronic device according to an embodiment of the present disclosure.

FIG. 13 is a flowchart of a method of an electronic device according to an embodiment of the present disclosure.

Referring to FIG. 13, in step 1310, the electronic device 800 may perform partial decoding. Step 1310 may be carried out by one or more of the channel decoder 850 or the processor 870 illustrated in FIG. 8.

In step 1320, the electronic device 800 may determine the success or failure of the partial decoding. For example, after terminating the partial decoding, the electronic device 800 may check a CRC to determine the success or failure of the partial decoding. Step 1320 may be carried out by one or more of the channel decoder 850 or the processor 870 illustrated in FIG. 8.

If it is determined that the partial decoding fails, in step 1330, the electronic device 800 may add received data of a next unit section to the first data and then perform partial decoding of the result. In addition, after performing the partial decoding, the electronic device 800 may perform a CRC check. If a CRC error occurs, the electronic device 800 may add data of a unit section to the received first data and then, again, perform the partial decoding of the result. In this case, partial decoding may represent decoding data to which is added data of a unit slot size to initially set the data to be partial decoded. Then, the electronic device 800 may return to step 1320 to perform the CRC check.

If it is determined that the partial decoding succeeds in step 1320, in step 1340, the electronic device 800 may perform complementary decoding. By performing complementary decoding, the electronic device 800 may guarantee a high decoding success rate, despite decoding data that is received early. Step 1340 may be carried out by one or more of the channel decoder 850 or the processor 870 illustrated in FIG. 8.

In step 1350, the electronic device 800 may perform a CRC check of the complementary decoding and determine success or failure of the complementary decoding. If the complementary decoding succeeds, the electronic device 800 may increase a complementary decoding success count. Step 1350 may be carried out by one or more of the channel decoder 850 or the processor 870 illustrated in FIG. 8.

In step 1360, the electronic device 800 may compare the complementary decoding success count to a threshold count. The threshold count may be a value that is predetermined by a user, etc. In addition, the threshold count may be a value set in accordance with determining a decoding mode or the complementary decoding success count. If the complementary decoding success count reaches the threshold count, the electronic device 800 may complete complementary decoding. Otherwise, if the complementary decoding success count does not reach the threshold count, the electronic device 800 may, again, perform step 1340. Step 1360 may be carried out by one or more of the channel decoder 850 or the processor 870 illustrated in FIG. 8.

In step 1370, the electronic device 800 may terminate receiving data within 1 TTI. For example, in FIG. 10, the electronic device 800 may not receive the data 1050. The electronic device 800 may output the complementary decoding result. The complementary decoding result may be forwarded to the decoder 860. In addition, the complementary decoding result may be forwarded to the processor 870.

By performing step 1310 to step 1370, the electronic device 800 may guarantee a higher decoding success rate than by performing complementary decoding once.

With reference to FIG. 13, a description is provided above for an example in which, after performing partial decoding, if it is determined that partial decoding fails, in step 1330, the electronic device 800 adds data of a unit section to the first data for which partial decoding is performed and then, again, performs partial decoding of the result. However, in the case where data of a greater amount is decoded, the decoding success probability may increase. Accordingly, if partial decoding fails, unlike in FIG. 13, in step 1340, the electronic device 800 may perform complementary decoding as well without again performing partial decoding. Then, if complementary decoding of a set success count succeeds, in step 1370, the electronic device 800 may terminate receiving data of a corresponding TTI section and transmit decoded data to the decoder 860.

For example, a 1 TTI consists of 15 slots (e.g. slot 0 to slot 14), and a complementary decoding success count is set to 2. In addition, for example, at a time when data of slot 8 is received, the electronic device 800 performs partial decoding of data of slot 0 to slot 8. Then, if the partial decoding results in a CRC error, the electronic device 800 may perform a first complementary decoding of data of slot 0 to slot 9. In addition, if the first complementary decoding of the data of slot 0 to slot 9 succeeds, the electronic device 800 may perform second complementary decoding of data of slot 0 to slot 10. If a CRC check of the second complementary decoding is determined to be a success, the electronic device 800 may determine that the second complementary decoding succeeds and terminate a channel decoding procedure. In addition, the electronic device 800 may terminate the operation of the RF RX 830.

During decoding, the decoding success probability increases if the amount of data being decoded is significant. In other words, the amount of data demodulated when performing complementary decoding may be greater than when performing partial decoding. Accordingly, decoding success reliability may increase.

Figure 14:
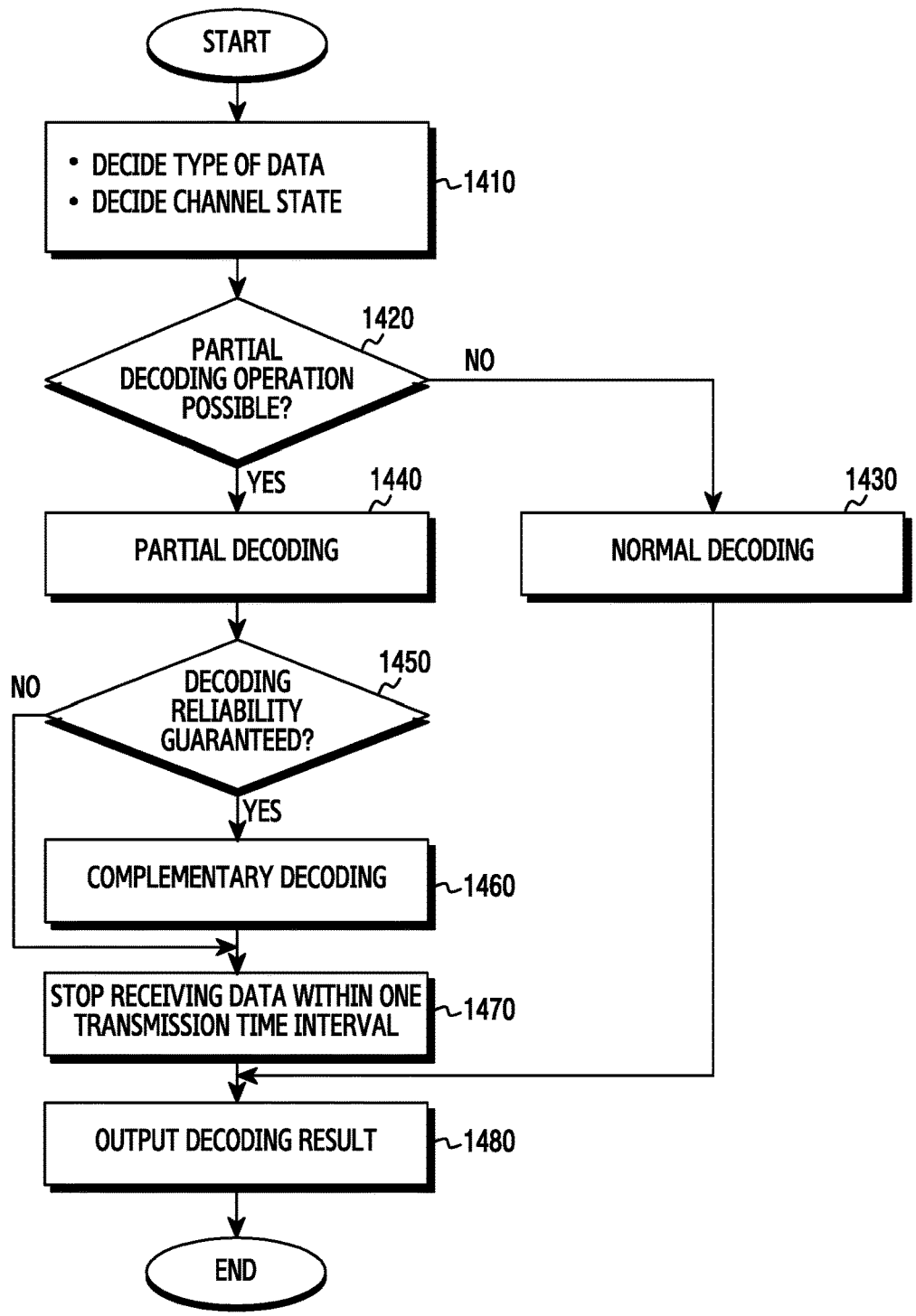
FIG. 14 is a flowchart of a method of an electronic device according to an embodiment of the present disclosure.

FIG. 14 is a flowchart of a method of an electronic device according to an embodiment of the present disclosure.

Referring to FIG. 14, in step 1410, the electronic device 800 may determine the type of received data. For example, the electronic device 800 may determine whether the type of received voice data is voice data and whether it is data received through a dedicated channel, etc. The electronic device 800 may determine a channel state. The channel state may be determined or estimated based on an SINR, a CINR, an RSS, etc. Step 1410 may be carried out by the processor 870 illustrated in FIG. 8.

In step 1420, the electronic device 800 may determine whether it is possible to perform partial decoding. The electronic device 800 may determine whether to perform partial decoding based on one or more of the type of data or channel state information determined in step 1410. For example, if it is determined that a channel state is good, and data suitable for partial decoding is received, the electronic device 800 may operate in the partial decoding mode. Otherwise, if the channel state is poor, the electronic device 800 may operate in a normal decoding mode. Step 1420 may be carried out by one or more of the channel decoder 850 or the processor 870 illustrated in FIG. 8.

In step 1430, the electronic device 800 may perform normal decoding according to the selection of the normal decoding mode in step 1420. That is, after receiving all of the data corresponding to 1 TTI, the electronic device 800 may perform decoding of the received data. For example, the electronic device 800 may perform normal decoding of the data 1000 of FIG. 10. Step 1430 may be carried out by the channel decoder 850 illustrated in FIG. 8.

In step 1440, the electronic device 800 may perform partial decoding according to the selection of the partial decoding mode in step 1420. That is, the electronic device 800 may receive data corresponding to a part of 1 TTI and perform decoding of the received data. For example, the electronic device 800 may perform partial decoding of the data 1010 of FIG. 10. In addition, the electronic device 800 may determine a partial decoding start time based on the channel state information acquired in step 1410. Step 1440 may be carried out by one or more of the channel decoder 850 or the processor 870 illustrated in FIG. 8.

In step 1450, the electronic device 800 may determine whether there is a need to guarantee the reliability of the partial decoding. If the success or failure of the partial decoding is to be guaranteed, in step 1460, the electronic device 800 may perform complementary decoding. Otherwise, if it is determined that partial decoding is sufficient, the electronic device 800 may omit step 1460 and perform step 1470. Step 1450 may be carried out by the processor 870 illustrated in FIG. 8.

In step 1460, the electronic device 800 may perform complementary decoding. The electronic device 800 may perform complementary decoding numerous times. In addition, the electronic device 800 may calculate a complementary decoding success count. Furthermore, the electronic device 800 may determine whether the complementary decoding success count reaches a threshold count. Step 1460 may be carried out by one or more of the channel decoder 850 or the processor 870 illustrated in FIG. 8.

In step 1470, the electronic device 800 may terminate receiving data within 1 TTI. For example, the electronic device 800 may not receive the data 1050 of FIG. 10. Step 1470 may be carried out by the processor 870 illustrated in FIG. 8.

In step 1480, the electronic device 800 may output the decoding result. The decoding result may be inputted to one or more of the decoder 860 or the processor 870.

Step 1470 and step 1480 may be performed in reverse order. In addition, step 1470 and step 1480 may be performed in parallel.

By performing step 1410 to step 1480, the electronic device 800 may decode received data through various decoding modes. Through various decoding, the electronic device 800 may guarantee a decoding success rate, and may reduce power consumption.

Figure 15:
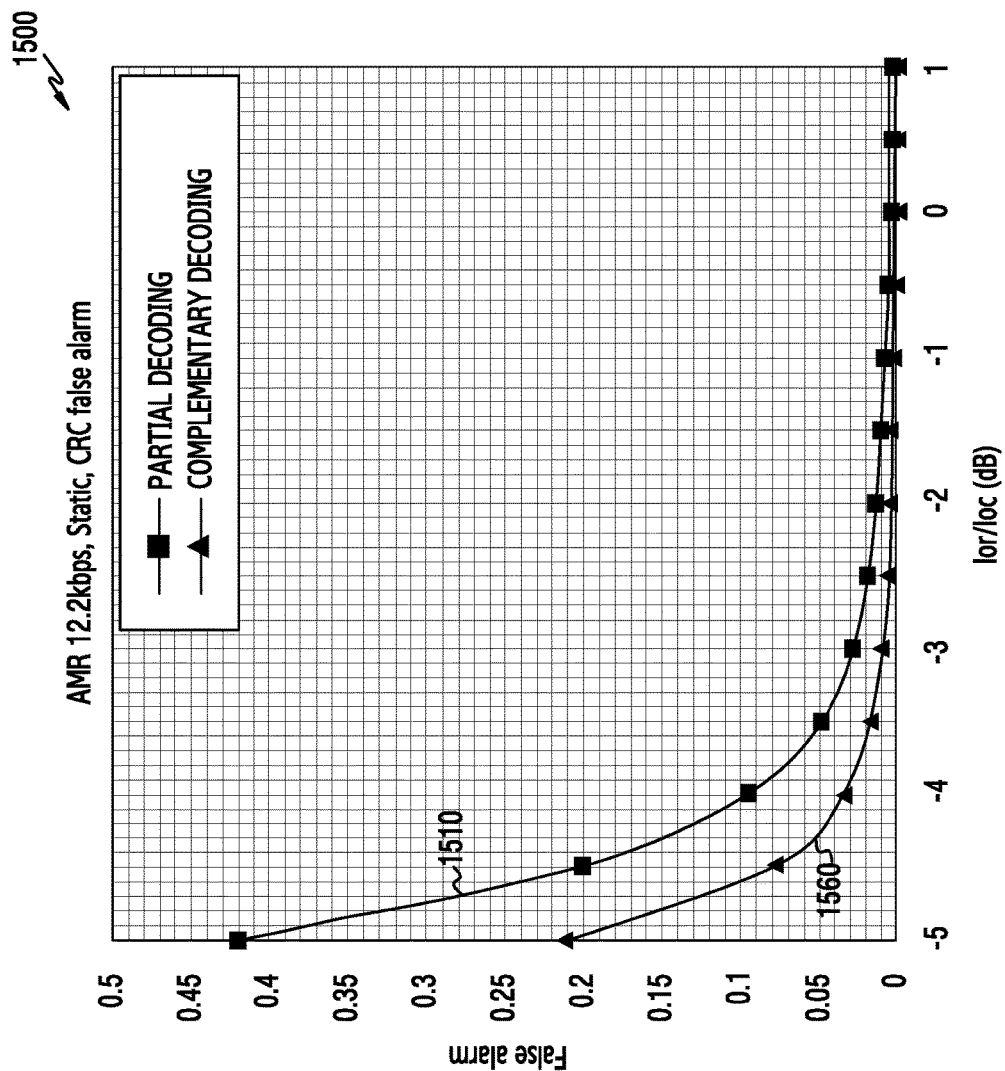
FIG. 15 is a graph illustrating a decoding false alarm probability according to an embodiment of the present disclosure.

FIG. 15 is a graph illustrating a decoding false alarm probability according to an embodiment of the present disclosure.

Referring to FIG. 15, the graph 1500 represents a false alarm probability measured for a third generation partnership project (3GPP) WCDMA AMR 12.2 Kbps channel. The horizontal axis of the graph 1500 represents an SINR of a received signal. The units of the horizontal axis of the graph 1500 are decibels (dBs). The vertical axis of the graph 1500 represents a false alarm probability. The curved line 1510 represents a false alarm probability according to partial decoding, and the curved line 1560 represents a false alarm probability according to complementary decoding.

As indicated in the curved line 1510 and the curved line 1560, when a channel environment is good (e.g. when an SINR is high), the electronic device 800 may succeed in partial decoding and/or complementary decoding with a high probability.

Comparing the curved line 1510 and the curved line 1560, in a case of performing complementary decoding (that is, in a case of the curved line 1560), the electronic device 800 may acquire a higher decoding success rate than in a case of performing partial decoding (that is, in a case of the curved line 1510).

A method of operating an electronic device according to various embodiments of the present disclosure may include decoding a first data wherein an amount of the first data received within one TTI reaches a target amount. If decoding of the first data succeeds, decoding a second data that includes the first data and additional data received during a unit section within one TTI. If decoding of the second data succeeds, transmitting the decoded second data, and terminating decoding of data received after the second data within the one transmission time interval. The method may further include, if decoding of the second data succeeds, terminating receiving data after receiving the second data within one transmission time interval.

In addition, the method may further include checking a channel state, and, if the channel state is good, initiating decoding of the first data, wherein checking the channel state may include checking the channel state based on one or more of an SINR, a CINR, or an RSS.

Furthermore, the target amount can correspond to some unit sections from among a plurality of unit sections configuring the one TTI.

Moreover, the method may further include, if decoding of the first data fails, decoding the second data in order to complement decode the first data, and, if decoding of the second data succeeds, decoding the third data that includes the second data and additional data received during the unit section within one TTI.

In addition, wherein decoding the first data may include decoding the first data by inserting a certain value into remaining data except the first data from among data of one TTI, and wherein decoding the second data includes decoding the second data by inserting the certain value into remaining data except the second data from among the data of one TTI.

Furthermore, wherein whether decoding of the first data succeeds or not may be determined by using a CRC check included in the first data.

Moreover, the received data may be voice data.

Figure 16:
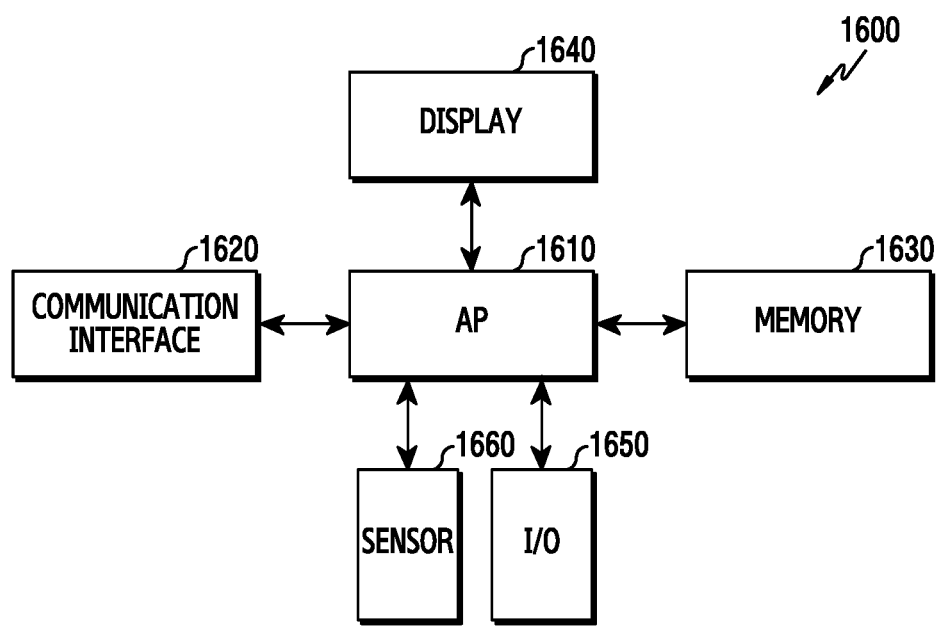
FIG. 16 is a block diagram of an IoT device including a wireless communication integrated circuit according to an embodiment of the present disclosure.

FIG. 16 is a block diagram of an IoT device 1600 including a wireless communication integrated circuit or chip according to an embodiment of the present disclosure.

Referring to FIG. 16, the IoT device 1600 may include a communication interface 1620 for communicating with externally. The communication interface 1620 may be, for example, a modem communication interface connectable to a mobile cellular network such as a wired short-range communication network (e.g. an LAN) and a wireless short-range communication interface power line communication (PLC) or $3^{rd}$ generation (3G), LTE, etc. such as BT, WiFi, and Zigbee.

The communication interface 1620 may include a transceiver and/or a receiver. The IoT device 1600 may transmit and/or receive information from an access point or gateway through the transceiver and/or receiver. In addition, the IoT device 1600 may communicate with a user device or other IoT devices to transmit and/or receive control information or data of the IoT device 1600.

The IoT device 1600 may further include a processor or an application processor (AP) 1610. The IoT device 1600 may include an embedded battery as an internal power supply or may further include a power supply unit for receiving the supply of power externally. In addition, the IoT device 1600 may include a display 1640 for displaying an internal state or data. A user may control the IoT device 1600 through a user interface (UI) of the display 1640 of the IoT device 1600. The IoT device 1600 may transmit an internal state and/or data to externally through the transceiver, and receive a control instruction and/or data externally through the receiver.

A memory 1630 may store control instruction code, control data or user data for controlling the IoT device 1600. The memory 1630 may include at least one of a volatile memory or a nonvolatile memory. The nonvolatile memory may include a read only memory (ROM), a programmable ROM (PROM), an electrically programmable ROM (EPROM), an electrically erasable PROM (EEPROM), a flash memory, a phase-change random access memory (PRAM), a magnetic RAM (MRAM), a resistive RAM (RRAM), a ferroelectric RAM (FRAM), etc. The volatile memory may include at least one of various memories such as a dynamic RAM (DRAM), a static RAM (SRAM), a synchronous DRAM (SDRAM), a PRAM, an MRAM, an RRAM, an FRAM, etc.

The IoT device 1600 may further include a storage device. The storage device may be a nonvolatile medium such as a hard disk drive (HDD), a solid state disk (SSD), an embedded multimedia card (eMMC), and a universal flash storage (UFS) device. The storage device may store user information provided through an input/output unit (I/O) 1650 and sense information collected through a sensor 1660.

If the IoT device 1600 is a device used in an environment in which power charging is difficult or if the IoT device 1600 is a small-sized device, a low power loss may be required for operating the IoT device 1600. In this case, the IoT device 1600 may include a wireless communication chip according to various embodiments of the present disclosure.

The wireless communication chip may be included in the communication interface 1620. In this case, the wireless communication chip may be a communication processor (CP).

Otherwise, the wireless communication chip may be included in the AP 1610. In this case, the wireless communication chip may be a partial constituent element of the AP 1610.

The IoT device 1600 including the wireless communication chip may succeed in decoding, without receiving all of the data of 1 TTI. Accordingly, the IoT device 1600 including the wireless communication chip may reduce power consumed during decoding. If decoding succeeds, the IoT device 1600 including the wireless communication chip may deactivate the receiver without receiving partial data within 1 TTI. Accordingly, the IoT device 1600 including the wireless communication chip may reduce power consumption.

A wireless communication chip according to various embodiments of the present disclosure may include a channel decoder, and a controller operatively coupled to the channel decoder, wherein the controller may be configured to decode first data wherein an amount of the first data received within one TTI reaches a target amount. If decoding of the first data succeeds, decode second data that includes the first data and additional data received during a unit section within the one TTI. If decoding of the second data succeeds, transmit the decoded second data, and terminate decoding of data received after receiving the second data within one TTI.

While the present disclosure has been shown and described with reference to certain embodiments thereof, it will be understood by those skilled in the art that various modification in form and details may be made therein without departing from the scope and spirit of the present disclosure as defined by the appended claims and their equivalents.

What is claimed is:

1. A method of operating a first electronic device in a wireless communication system, the method comprising:

determining whether or not a channel quality value of a received signal is greater than a designated value;

if the channel quality value is greater than the designated value, performing a partial decoding and a complementary decoding; and if the channel quality value is not greater than the designated value, performing a normal decoding, wherein performing the partial decoding and the complementary decoding comprises:

decoding first data received from a second electronic device during a first part of one transmission time interval (TTI) as the partial decoding;

in response to detecting that the decoding of the first data succeeds, generating second data by combining the decoded first data and additional data, wherein the additional data is received from the second electronic device during a second part of the one TTI after the first part of the one TTI;

decoding the generated second data as the complementary decoding; and in response to detecting that the decoding of the second data succeeds, providing the decoded second data to a source decoder, and terminating a decoding procedure for the one TTI; and wherein performing the normal decoding comprises:
decoding all data of the one TTI; and
providing the decoded data to the source decoder.

2. The method of claim 1, wherein performing the partial decoding further comprises:

in response to detecting that the decoding of the second data succeeds, terminating receiving of data received within the one TTI after the second part of the one TTI, and wherein the decoded second data is provided to the source decoder.

3. The method of claim 1, wherein an amount of the first data corresponds to at least one unit section from among a plurality of unit sections configuring the one TTI, and wherein the unit section corresponds to a slot.

4. The method of claim 1, wherein performing the complementary decoding further comprises:

in response to detecting that the decoding of the first data fails, generating third data by combining the received first data and additional data, and decoding the generated third data in order to complement the decoding of the first data;

in response to detecting that the decoding of the third data succeeds, generating fourth data by combining the decoded third data and another additional data, and decoding the fourth data, wherein the another additional data is received from the second electronic device during a third part of the one TTI after the second part of the one TTI; and transmitting the decoded fourth data to the source decoder.

5. The method of claim 1, wherein decoding the first data comprises decoding the first data by inserting a predetermined value into a remaining part except the first data in the one TTI, and wherein decoding the second data comprises decoding the second data by inserting the predetermined value into a remaining part except the second data in the one TTI.

6. The method of claim 5, wherein performing the partial decoding further comprises:

determining whether the decoding of the first data succeeds or not by using a cyclic redundancy check (CRC) included in the first data.

7. The method of claim 6, wherein data received during the one TTI includes voice data.

8. A wireless communication integrated circuit of a first electronic device, the wireless communication integrated circuit comprising:
at least one channel decoder; and
a controller operatively coupled to the channel decoder, wherein the controller is configured to:
determine whether or not a channel quality value of a received signal is greater than a designated value;
if the channel quality value is greater than the designated value, perform a partial decoding and a complementary decoding; and
if the channel quality value is not greater than the designated value, perform a normal decoding,
wherein the controller, in order to perform the partial decoding and the complementary decoding, is further configured to:
decode first data received from a second electronic device during a first part of one transmission time interval (TTI) as the partial decoding;
in response to detecting that the decoding of the first data succeeds, generate second data by combining the decoded first data and additional data, wherein the additional data is received from the second electronic device during a second part of the one TTI after the first part of the one TTI;
decode the generated second data as the complementary decoding; and
in response to detecting that the decoding of the second data succeeds, provide the decoded second data to a source decoder, and terminate a decoding procedure for TTI, and
wherein the controller, in order to perform the normal decoding, is further configured to:
decode all data of the one TTI as the normal decoding, and
provide the decoded data to the source decoder.

9. A first electronic device in a wireless communication system, the device comprising:
at least one processor configured to execute instructions;
at least one receiver operatively coupled to the at least one processor; and
at least one channel decoder operatively coupled to the at least one processor,
wherein the at least one processor is configured to:
determine whether or not a channel quality value of a received signal is greater than a designated value;
if the channel quality value is greater than the designated value, performing a partial decoding and a complementary decoding; and
if the channel quality value is not greater than the designated value, perform a normal decoding,
wherein the at least one processor, in order to perform the partial decoding and the complementary decoding, is further configured to:
decode first data received from a second electronic device during a first part of one transmission time interval (TTI) as the partial decoding;
in response to detecting that the decoding of the first data succeeds, generate second data by combining the decoded first data and additional data, wherein the additional data is received from the second electronic device during a second part of the one TTI after the first part of the one TTI;
decode the generated second data as the complementary decoding; and
in response to detecting that the decoding of the second data succeeds, provide the decoded second data to a source decoder, and terminate a decoding procedure for the one TTI; and
wherein the at least one processor, in order to perform the normal decoding, is further configured to:
decode all data of the one TTI as the normal decoding, and
provide the decoded data to the source decoder.

10. The device of claim 9, wherein the at least one processor, in order to perform the partial decoding, is further configured to:
in response to detecting that the decoding of the second data succeeds, terminate receiving of data received within the one TTI after the second part of the one TTI, and
wherein the decoded second data is provided to the source decoder.

11. The device of claim 9, wherein an amount of the first data corresponds to at least one unit section from among a plurality of unit sections configuring the one TTI, and
wherein the unit section corresponds to a slot.

12. The device of claim 9, wherein the at least one processor, in order to perform the complementary decoding, is further configured to:
in response to detecting that the decoding of the first data fails, generate third data by combining the received first data and additional data, and decode the generated third data in order to complement the decoding of the first data;
in response to detecting that the decoding of the second data succeeds, generating fourth data by combining the decoded third data and another additional data, and decode the fourth data, wherein the another additional data is received from the second electronic device during a third part of the one TTI after the second part of the one TTI; and
transmit the decoded fourth data to the source decoder.

13. The device of claim 9, wherein the at least one processor is further configured to:
decode the first data by inserting a predetermined value into a remaining part except the first data in the one TTI; and
decode the second data by inserting the predetermined value into a remaining part except the second data in the one TTI.

14. The device of claim 13, wherein the at least one processor, in order to perform the partial decoding, is further configured to determine whether the decoding of the first data succeeds or not by using a cyclic redundancy check (CRC) included in the first data.

15. The device of claim 14, wherein data received during the one TTI includes voice data.

16. The device of claim 15, further comprising at least one decoder,
wherein the at least one decoder is a voice decoder, and
wherein the at least one processor is further configured to, in response to detecting that the decoding of the second data succeeds, provide the decoded second data to the at least one decoder.

* * * * *